United States Patent
Zhu et al.

(10) Patent No.: US 8,761,966 B2
(45) Date of Patent: Jun. 24, 2014

(54) TRAJECTORY TRACKING FLIGHT CONTROLLER

(75) Inventors: Jianchao Zhu, Athens, OH (US); Tony M. Adami, Athens, OH (US)

(73) Assignee: Ohio University, Athens, OH (US)

(*) Notice: Subject to any disclaimer, the term of this patent is extended or adjusted under 35 U.S.C. 154(b) by 167 days.

(21) Appl. No.: 13/260,037

(22) PCT Filed: Mar. 25, 2010

(86) PCT No.: PCT/US2010/028632
§ 371 (c)(1),
(2), (4) Date: Nov. 21, 2011

(87) PCT Pub. No.: WO2010/138236
PCT Pub. Date: Dec. 2, 2010

(65) Prior Publication Data
US 2012/0095621 A1 Apr. 19, 2012

Related U.S. Application Data

(60) Provisional application No. 61/163,650, filed on Mar. 26, 2009.

(51) Int. Cl.
G05D 1/08 (2006.01)
G05D 1/10 (2006.01)
G05D 1/12 (2006.01)

(52) U.S. Cl.
CPC ............... G05D 1/08 (2013.01); G05D 1/0808 (2013.01); G05D 1/0825 (2013.01)
USPC ........ 701/3; 701/4; 701/11; 701/12; 701/466; 244/75.1; 244/76 R; 244/175; 244/194; 244/195

(58) Field of Classification Search
CPC ...... G05D 1/08; G05D 1/0808; G05D 1/0825
See application file for complete search history.

(56) References Cited

U.S. PATENT DOCUMENTS

| | | | |
|---|---|---|---|
| 6,061,611 A * | 5/2000 | Whitmore | 701/4 |
| 6,246,929 B1 * | 6/2001 | Kaloust | 701/11 |
| 7,177,710 B2 | 2/2007 | Calise et al. | |
| 7,191,985 B2 * | 3/2007 | Najmabadi et al. | 244/195 |
| 7,970,498 B2 * | 6/2011 | Sahasrabudhe et al. | 701/3 |
| 8,019,492 B2 * | 9/2011 | Halaas | 701/12 |
| 8,209,068 B2 * | 6/2012 | Vos et al. | 701/8 |
| 2007/0156297 A1 | 7/2007 | Tzidon | |

OTHER PUBLICATIONS

Liu, Yong, et al., "Reactive Flow Control of Delta Wing Vortex," J. Aircraft, (2008) 45(3), pp. 880-892.

(Continued)

Primary Examiner — John Q Nguyen
Assistant Examiner — Edward Torchinsky
(74) Attorney, Agent, or Firm — Wood, Herron & Evans, LLP

(57) ABSTRACT

A six degree-of-freedom trajectory linearization controller (TLC) architecture (30) for a fixed-wing aircraft (46) is set forth. The TLC architecture (30) calculates nominal force and moment commands by dynamic inversion of the nonlinear equations of motion. A linear time-varying (LTV) tracking error regulator provides exponential stability of the tracking error dynamics and robustness to model uncertainty and error. The basic control loop includes a closed-loop, LTV stabilizing controller (12), a pseudo-inverse plant model (14), and a nonlinear plant model(16). Four of the basic control loops (34, 36, 40, 42) are nested to form the TLC architecture (30).

20 Claims, 9 Drawing Sheets

(56) References Cited

OTHER PUBLICATIONS

Ren, W. and R. Beard, "Trajectory Tracking for Unmanned Air Vehicles with Velocity and Heading Rate Constraints," IEEE Transactions on Control Systems Technology, (2004) 12(5), pp. 706-716.

Ren, W. and E. Atkins, "Nonlinear Trajectory Tracking for Fixed Wing UAVs via Backstepping and Parameter Adaptation," In Proc. AIAA Guidance, Navigation, and Control Conference, (Aug. 15-18, 2005), San Francisco, CA, 11 pgs.

Kaminer, I. et al. "Trajectory Tracking for Autonomous Vehicles: An Integrated Approach to Guidance and Control," J. Guidance, Control, and Dynamics, (1998) 21(1), pp. 29-38.

Frazzoli, E. et al., "Trajectory tracking control design for autonomous helicopters using a backstepping algorithm," In Proc. 2000 American Control Conference, (2000) 6, Chicago, IL, pp. 4102-4107.

Cicolani L. and S. Weissenberger, "A nonlinear trajectory command generator for a digital flight-control system", NASA Technical Paper 1221, (Nov. 1978).

Kanishege, J. et al., "Generic Neural Flight Control and Autopilot System," In Proc. AIAA Guidance, Navigation and Control Conference, (Aug. 2000) 11 pgs.

Sharma M. et al., "Application of an adaptive autopilot design to a family of guided munitions," In Proc. AIAA Guidance, Navigation, and Control Conference and Exhibit, (Aug. 14-17, 2000) Denver, CO, 9 pgs.

Graham, D. "Retrospective Essay on Nonlinearities in Aircraft Fight Control," J. of Guidance, Control, and Dynamics, (1991) 14(6), pp. 1089-1099.

Cloutier, J. et al., "Assessment of air to air missile guidance and control technology," IEEE Ctrl. Sys. Mag. (1989), pp. 27-34.

Zhu, J. and M. Mickle, "Missile autopilot design using a new linear time-varying control technique," J. on Guidance, Control, and Dynamics, (1997) 20(1), pp. 150-157.

Mickle, M. and J. Zhu, "A Nonlinear Roll-Yaw Missile Autopilot Based on Plant Inversion and PD-Spectral Assignment," In Proc. 37th IEEE Conf. Decision and Control, (1998) Tampa, FL, 6 pgs.

Zhu J., "PD-spectral theory for multivariable linear time-varying systems," In Proc. 46th IEEE Conf. Decision and Control, (Dec. 1997) San Diego, CA, 6 pgs.

Bevacqua, T. et al., "Improved Trajectory Linearization Flight Controller for Reusable Launch Vehicles," In Proc. 42nd Aerospace Sciences Meeting and Exhibit Conference, (Jan. 2004) Reno, NV, 12 pgs.

Adami, T.A. and J. J. Zhu, "Control of a Flexible, Hypersonic Scramjet Vehicle Using a Differential Algebraic Approach," In Proc. AIAA Guidance, Navigation and Control Conference, (Aug. 18-21, 2008), Honolulu, HW, 12 pgs.

Huang, R. et al., "Guidance, Navigation and Control System Design for a Tri-Propeller Vertical-Take-Off-and-Landing Unmanned-Air-Vehicle," J. Aircraft. (2009) 46(6): pp. 1837-1856.

Sontag E., "A Lyapunov-like characterization of asymptotic controllability," SIAM J. Control Optim., (1983) 21(3), pp. 462-471.

Artstein Z., "Stabilization with relaxed controls," Nonlinear Anal., Theory, Methods, Applicat., (1983) 7(11), pp. 1163-1173.

Mayne, D. and H. Michalska, "Receding horizon control of nonlinear systems," IEEE Trans. Automat. Contr., (1990) 35, pp. 814-824.

Lin, Y. and E. D. Sontag, "Control-Lyapunov universal formulas for restricted inputs," Control Theory Adv. Technol., (1995) 10(4), pp. 1-23.

Lin, Y. and E. D. Sontag, "A universal formula for stabilization with bounded controls," Syst. Control Lett., (1991) 16, pp. 393-397.

Narendra, K. S. and K. Parthasarathy, "Identification and control for dynamic systems using neural networks," IEEE Trans. Neural Networks, (1990) 1, pp. 4-27.

Kim, B. and A. Calise, "Nonlinear Flight Control Using Neural Networks," J. Guidance, Control, Dynamics, (1997) 20 (1), pp. 26-33.

Poznyak, W. et al., "Nonlinear Adaptive Trajectory Tracking Using Dynamic Neural Networks," IEEE Trans. Neural Networks, (1999) 10(6), pp. 1402-1411.

Johnson E. et al., "A Six Degree-of-Freedom Adaptive Flight Control Architecture for Trajectory Following," In. Proc. AIAA Guidance, Navigation, and Control Conference and Exhibit, (Aug. 5-8, 2002) Monterey, CA, 11 pgs.

JSBSIM, An open source, platform-independent, flight dynamics model in C++, (2008), pp. 1-92.

Duan, L. et al., "Flight-Path Tracking Control of a Transportation Aircraft: Comparison of Two Nonlinear Design Approaches," In Proc. 25th Digital Avionics Systems Conf., (Oct. 15-19, 2006), pp. 1-9.

JSBSIM, An open source, platform-independent, flight dynamics model in C++, (2008) pp. 93-158.

* cited by examiner

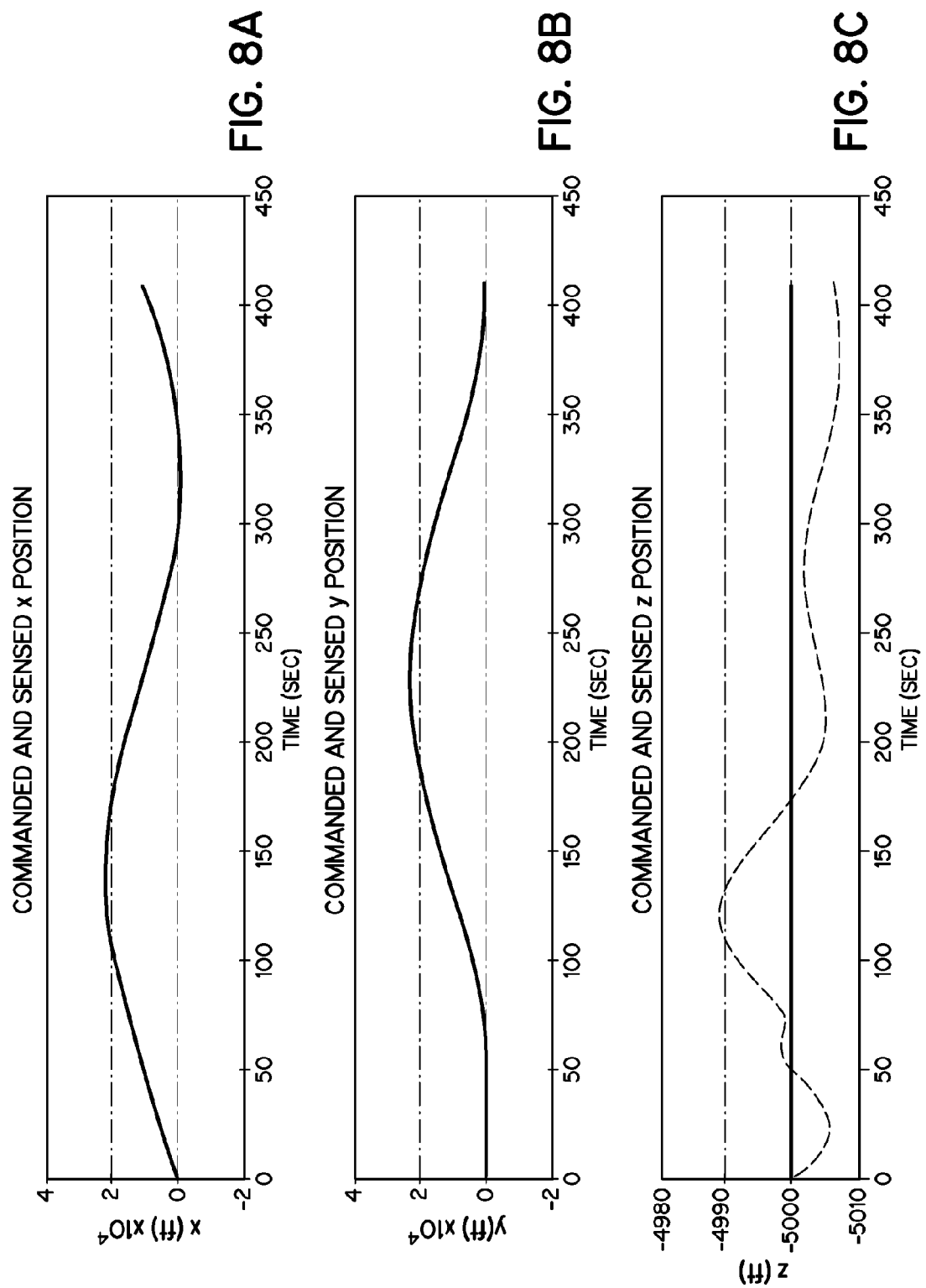

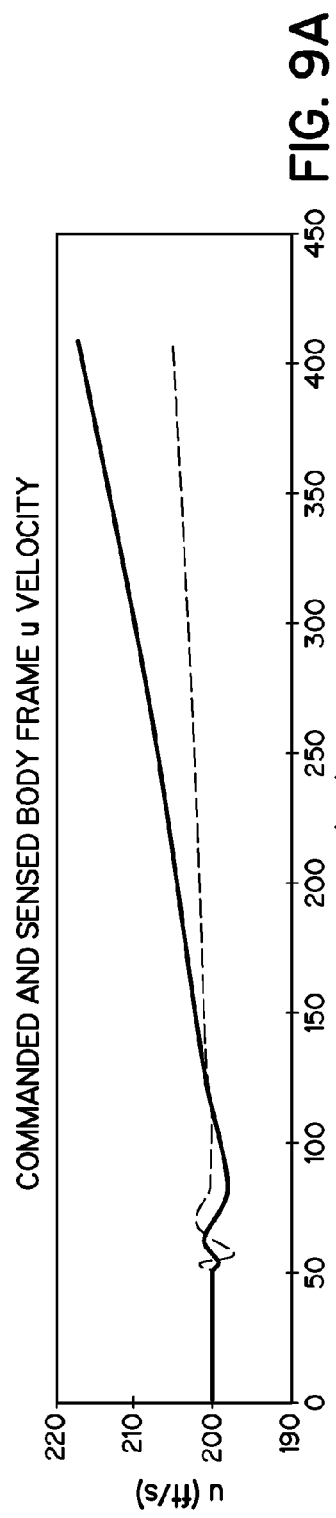
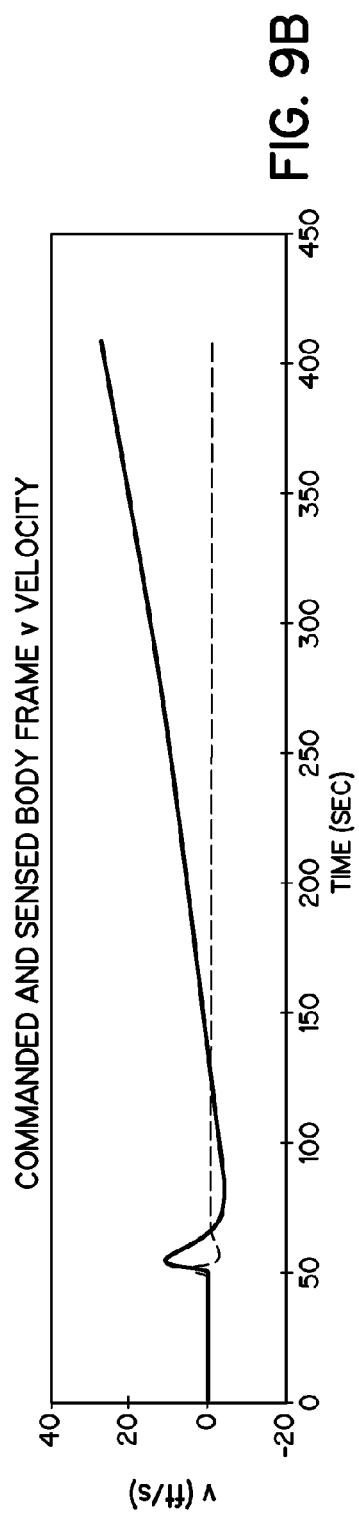
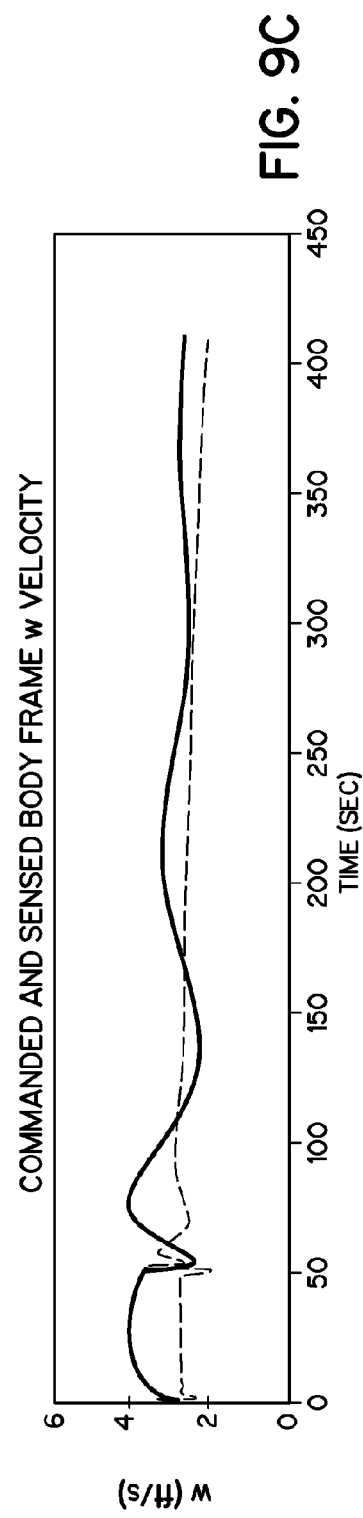
FIG. 9A
FIG. 9B
FIG. 9C

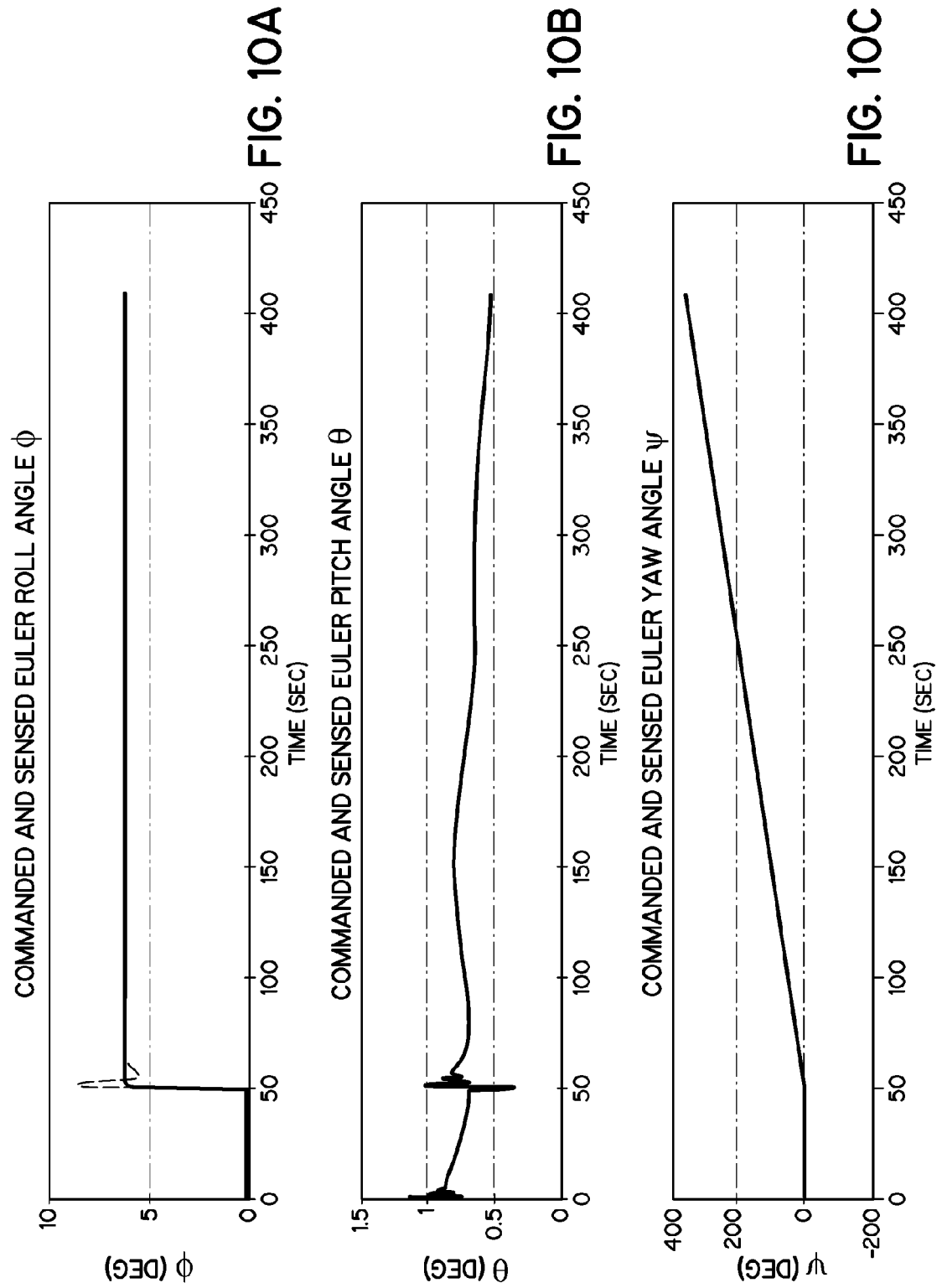

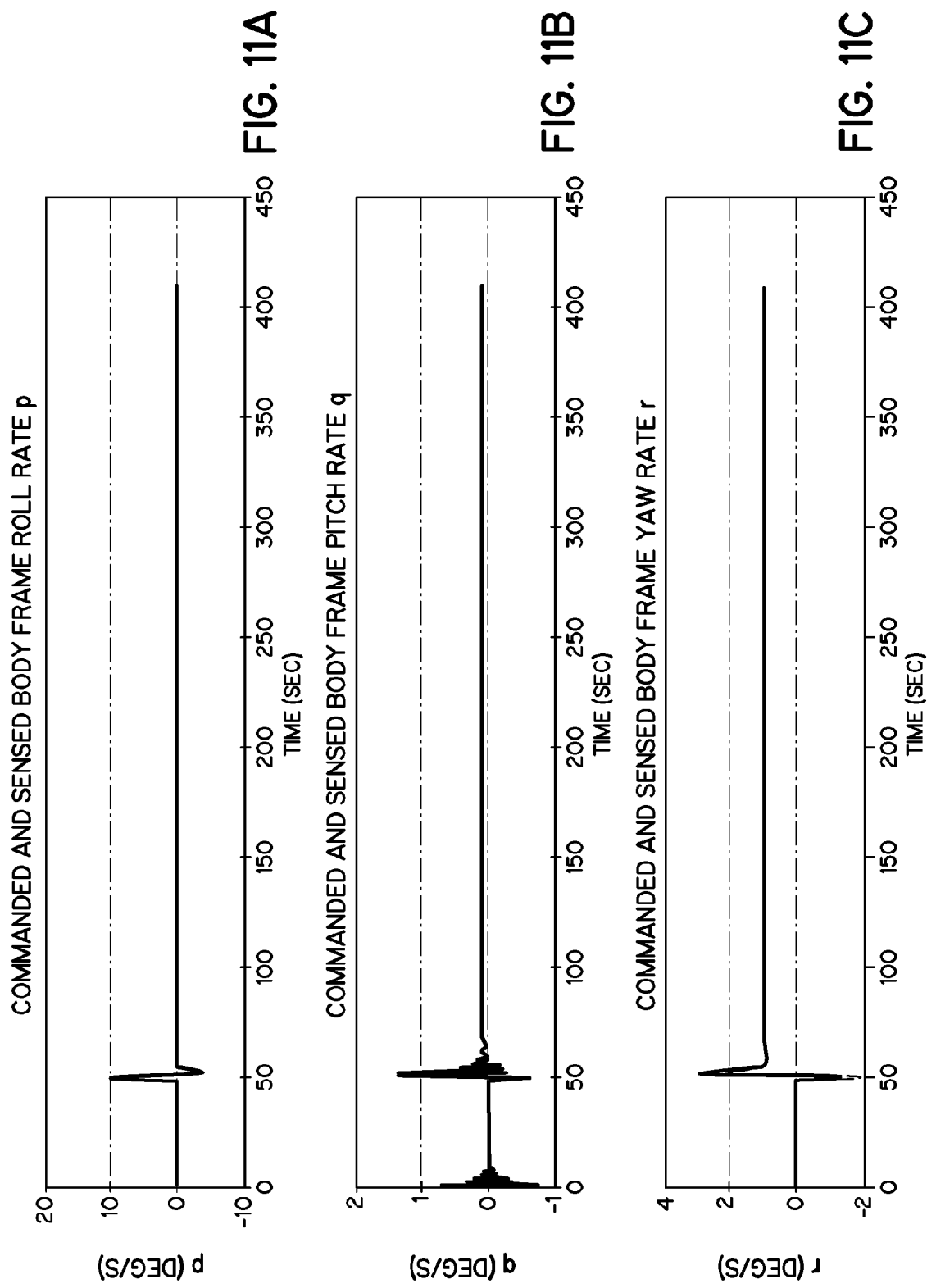

TRAJECTORY TRACKING FLIGHT CONTROLLER

FIELD OF THE INVENTION

The invention relates generally to a trajectory tracking controller for a fixed-wing aircraft.

BACKGROUND OF THE INVENTION

Trajectory tracking control has been studied extensively and applied to wide range of platforms, including small unmanned vehicles, helicopters, transport-class aircraft in the context of next-generation air transport, and resilient aircraft control. Tracking on guided munitions and missile systems in particular poses significant technical challenges because of inherent uncertainties, nonlinearity of the systems, and demanding performance requirements for tracking highly maneuverable targets.

Gain scheduling has been used for trajectory tracking of autonomous vehicles, though gain-scheduling approaches are often used ad-hoc in the design. Trajectory Linearization Control (TLC) has been described as including consisting of a nonlinear, dynamic pseudo-inversion based open-loop nominal controller, together with a linear, time-varying (LTV) feedback controller to exponentially stabilize the linearized tracking error dynamics. This approach was applied to a multiple-input, multiple-out (MIMO) system, which presents a trajectory linearization approach on a roll-yaw autopilot for a non-axisymmetric missile model. TLC controllers have also been designed for a three degree-of-freedom (3DOF) control of a reusable launch vehicle, a 3DOF longitudinal control of a hypersonic scramjet dynamics model, and a six degree-of-freedom (6DOF) control of a vertical take-off and landing (VTOL) aircraft model.

Control Lyapunov function (CLF) approaches have been used for nonlinear controller design for the trajectory tracking problem. Receding horizon control (RHC) and model predictive control (MPC) approaches have also been evaluated. CLF has been used to construct universal stabilizing formulas for various constrained input cases: for instance, in a system with control inputs bounded to a unit sphere, and a system with positive bound scalar control inputs. The CLF approach is applied to constrained nonlinear trajectory tracking control for an unmanned aerial vehicle (UAV) outside of an established longitudinal and lateral mode autopilot, where inputs are subject to rate constraints. Control input that satisfies the tracking requirements is selected from a feasible set of inputs which was generated through a CLF designed for the input constraints. This approach was extended to perform nonlinear tracking utilizing backstepping techniques to develop a velocity and roll angle control law for a fixed wing UAV, and unknown autopilot constants are identified through parameter adaptation. A similar backstepping approach has been utilized on trajectory tracking control for helicopters. A backstepping controller has been compared to a classical nonlinear dynamic inversion control approach for a path angle trajectory controller, where model selection was found to impact performance of the inversion control, but the backstepping approach led to a complex control structure that was difficult to test with limited guarantee of stability.

Adaptive control approaches have also been studied in the literature to handle uncertainty. In particular, approaches utilizing neural networks seem to be an effective tool to control a wide class of complex nonlinear systems with incomplete model information. Dynamic neural networks are utilized for adaptive nonlinear identification trajectory tracking, where a dynamic Lyapunov-like analysis is utilized to determine stability conditions utilizing algebraic and differential Riccati equations. Dynamic inversion control augmented by an on-line neural network has been applied to several platforms, including guided munitions and damaged aircraft, and has been applied to a trajectory following flight control architecture.

Because of the highly nonlinear and time-varying nature of flight dynamics in maneuvering trajectory tracking, conventional flight controllers typically rely on gain-scheduling a bank of controllers designed using linear time-invariant (LTI) system theory. Gain-scheduling controllers suffer from inherent slowly-time-varying and benign nonlinearity constraints, and the controller design and tuning are highly trajectory dependent. Modern nonlinear control techniques such as feedback linearization and dynamic inversion alleviate these limitations by cancelling the nonlinearity via a coordinate transformation and state feedback, or by constructing a dynamic (pseudo) inverse of the nonlinear plant. LTI tracking error dynamics can be formulated after the nonlinear cancellation, and controlled by LTI controllers. A drawback of this type of control scheme is that the nonlinearity cancellation is accomplished in the LTI control loop. Consequently, imperfect cancellation because of sensor dynamics or modeling errors result in nonlinear dynamics that are not compensated for by the LTI controller design, and cannot be effectively accommodated by the LTI controller.

SUMMARY OF THE INVENTION

To address these new challenges, a 6DOF trajectory tracking TLC architecture for a fixed-wing aircraft was developed. As implemented in a fixed-wing aircraft, one embodiment of the invention comprises a trajectory planner adapted to produce a command position vector for a fixed-wing aircraft; a TLC architecture electrically coupled to the trajectory planner to receive the command position vector from the trajectory planner; an avionic sensor electrically couple to the TLC architecture to send a sensed parameter to the TLC architecture; and a control actuator electronically coupled to the TLC architecture to receive a control signal from the TLC architecture.

The TLC architecture includes a processor and program code configured to execute on the processor to generate the control signal by determining in a first control loop a nominal body velocity vector and a feedback control body velocity command vector using the command position vector from the trajectory planner; determining in a second control loop a nominal Euler angle vector, a feedback control Euler angle command vector, and a throttle setting feedback control command using the nominal body velocity vector and the feedback control body velocity command vector from the first control loop; determining in a third control loop a nominal body rate vector and a feedback control body rate command vector using the nominal Euler angle vector and the feedback control Euler angle command vector from the second control loop; determining in a fourth control loop a moment command vector using the nominal body rate vector and the feedback control body rate command vector from the third control loop; and determining the control signal using the moment command vector from the fourth control loop.

In another aspect of this embodiment, the control signal is further generated by determining in the first control loop the feedback control body velocity command vector further uses a sensed position vector from the avionic sensor, determining in the second control loop the feedback control Euler angle command vector and the throttle setting feedback control command further uses a sensed velocity vector from the avionic sensor, determining in the third control loop the nominal body rate vector and the feedback control body rate command vector further uses a sensed Euler angle vector from the avionic sensor, determining in the fourth control loop the moment command vector further uses a sensed body rate vector from the avionic sensor.

The control signal includes an engine throttle, aileron, elevator, rudder, or a direct lift (such as a flaperon) deflection command. The aircraft may include an airframe and a control effector, where the control effector is adapted to receive the control signal from the control actuator. The control effector is an engine throttle, aileron, elevator, rudder, or flaperon.

The invention also contemplates a method of generating a control signal, the method comprising determining using a hardware implemented processor in a first control loop a nominal body velocity vector and a feedback control body velocity command vector using a command position vector for a fixed-wing aircraft from a trajectory planner; determining using the processor in a second control loop a nominal Euler angle vector, a feedback control Euler angle command vector, and a throttle setting feedback control command using the nominal body velocity vector and the feedback control body velocity command vector from the first control loop; determining using the processor in a third control loop a nominal body rate vector and a feedback control body rate command vector using the nominal Euler angle vector and the feedback control Euler angle command vector from the second control loop; determining using the processor in a fourth control loop a moment command vector using the nominal body rate vector and the feedback control body rate command vector from the third control loop; and determining using the processor a control signal using the moment command vector from the fourth control loop.

The method may also generate the control signal based in part on sensed parameters from an avionics sensor. Thus, the generating the control signal may involve determining in the first control loop the feedback control body velocity command vector further uses a sensed position vector from the avionics sensor, determining in the second control loop the feedback control Euler angle command vector and the throttle setting feedback control command further uses a sensed velocity vector from the avionic sensor, determining in the third control loop the nominal body rate vector and the feedback control body rate command vector further uses a sensed Euler angle vector from the avionic sensor, determining in the fourth control loop the moment command vector further uses a sensed body rate vector from the avionic sensor.

The invention also contemplates a program product comprising a computer readable medium and program code stored on the computer readable medium, the program code configured to execute on a hardware implemented processor to generate a control signal by determining in a first control loop a nominal body velocity vector and a feedback control body velocity command vector using the command position vector from a trajectory planner; determining in a second control loop a nominal Euler angle vector, a feedback control Euler angle command vector, and a throttle setting feedback control command using the nominal body velocity vector and the feedback control body velocity command vector from the first control loop; determining in a third control loop a nominal body rate vector and a feedback control body rate command vector using the nominal Euler angle vector and the feedback control Euler angle command vector from the second control loop; determining in a fourth control loop a moment command vector using the nominal body rate vector and the feedback control body rate command vector from the third control loop; and determining the control signal using the moment command vector from the fourth control loop.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

FIG. 8a is a graph of the commanded and sensed x position for the Design Verification Example.

FIG. 8b is a graph of the commanded and sensed y position for the Design Verification Example.

FIG. 8c is a graph of the commanded and sensed z position for the Design Verification Example.

FIG. 9a is a graph of the commanded and sensed body frame u velocity for the Design Verification Example.

FIG. 9b is a graph of the commanded and sensed body frame v velocity for the Design Verification Example.

FIG. 9c is a graph of the commanded and sensed body frame w velocity for the Design Verification Example.

FIG. 10a is a graph of the commanded and sensed Euler roll angle for the Design Verification Example.

FIG. 10b is a graph of the commanded and sensed Euler pitch angle for the Design Verification Example.

FIG. 10c is a graph of the commanded and sensed Euler yaw angle for the Design Verification Example.

FIG. 11a is a graph of the commanded and sensed body frame roll rate for the Design Verification Example.

FIG. 11b is a graph of the commanded and sensed body frame pitch rate for the Design Verification Example.

FIG. 11c is a graph of the commanded and sensed yaw body frame rate for the Design Verification Example.

DETAILED DESCRIPTION

A. Nomenclature

Figure 1:
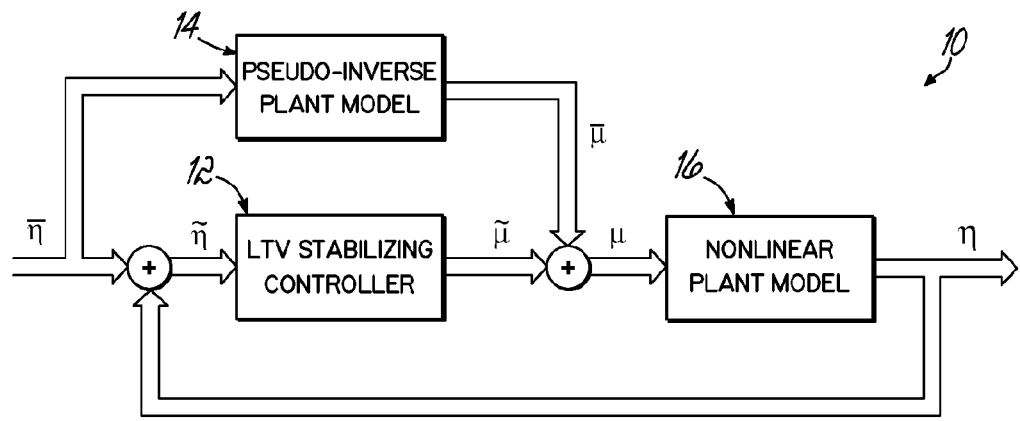
FIG. 1 is a block diagram of a basic control loop configuration used to construct the TLC architecture of the invention.

The following is a list of the nomenclature used in the detailed description and drawings.

$P_{com} = [x_{E,com} \ y_{E,com} \ z_{E,com}]^T$ = reference trajectory in inertial frame $V_{t,com}, \gamma_{com}, \chi_{com}$ = reference velocity magnitude, flight path angle and heading angle $P=[x_E \ y_E \ z_E]^T$=sensed inertial frame position vector (flat-Earth)

$\overline{P}=[\overline{x}_E \ \overline{y}_E \ \overline{z}_E]^T$=nominal inertial frame position vector $P_{com}=[x_{E,com} \ y_{E,com} \ z_{E,com}]^T$=commanded inertial frame position vector $P_{err}=[x_{E,err} \ y_{E,err} \ z_{E,err}]^T$=inertial frame position error vector $V=[u \ v \ w]^T$=sensed body frame velocity vector $\overline{V}=[\overline{u} \ \overline{v} \ \overline{w}]^T$=nominal body frame velocity vector $V_{com}=[u_{com} \ v_{com} \ w_{com}]^T$=commanded body frame velocity vector $V_{err}=[u_{err} \ v_{err} \ w_{err}]$=body frame velocity error vector $F_b=[F_x \ F_y \ F_z]^T$=sensed total body frame force vector $\overline{F}_b=[\overline{F}_x \ \overline{F}_y \ \overline{F}_z]^T$=nominal total body frame force vector $F_{b,ctrl}=[F_{x,ctrl} \ F_{y,ctrl} \ F_{z,ctrl}]^T$=feedback control body frame force vector $F_{b,a}=[F_{x,a} \ F_{y,a} \ F_{z,a}]^T$=aerodynamic force vector in the body frame $F_{w,a}=[F_{wx,a} \ F_{wy,a} \ F_{wz,a}]^T$=aerodynamic force vector in the wind frame D, C, L=wind frame drag, side, and lift force vectors $\Gamma=[\phi \ \theta \ \psi]^T$=sensed Euler angles (yaw-pitch-roll convention)

$\overline{\Gamma}=[\overline{\phi} \ \overline{\theta} \ \overline{\psi}]^T$=nominal Euler angles $\Gamma_{com}=[\phi_{com} \ \theta_{com} \ \psi_{com}]^T$=commanded Euler angles $\Gamma_{err}=[\phi_{err} \ \theta_{err} \ \psi_{err}]^T$=Euler angle error vector $\Lambda=[\sigma \ \gamma \ \chi]^T$=sensed inertial bank-, flight path-, and heading angles $\Omega=[p \ q \ r]^T$=sensed body frame angular rate vector $\overline{\Omega}=[\overline{p} \ \overline{q} \ \overline{r}]^T$=nominal body frame angular rate vector $\Omega_{ctrl}=[p_{ctrl} \ q_{ctrl} \ r_{ctrl}]^T$=feedback control body frame angular rate vector $\Omega_{err}=[p_{err} \ q_{err} \ r_{err}]^T$=angular body rate error vector $T_m=[L_m \ M_m \ N_m]^T$=sensed moment vector at aircraft center-of-gravity (cg)

$\overline{T}_m=[\overline{L}_m \ \overline{M}_m \ \overline{N}_m]^T$=nominal moment vector at aircraft cg $T_{m,ctrl}=[L_{m,ctrl} \ M_{m,ctrl} \ N_{m,ctrl}]^T$=feedback control moment vector at aircraft cg $T_{m,com}=[L_{m,com} \ M_{m,com} \ N_{m,com}]^T$=moment command vector at aircraft cg $(T_{m,com}=\overline{T}_m+T_{m,ctrl})$ $V_t=\sqrt{u^2+v^2+w^2}$=magnitude of velocity vector $\alpha$=angle-of-attack (AOA)

$\beta$=sideslip angle (SA)

$\overline{\alpha},\overline{\alpha}_1$=nominal AOA for previous time-step, nominal AOA at current time-step $\overline{\beta},\overline{\beta}_1$=nominal SA for previous time-step, nominal SA at current time-step $\alpha_{trim},\beta_{trim},\delta_{\tau,trim}$=AOA, SA, and throttle setting at trim condition $\delta_{a,trim},\delta_{e,trim},\delta_{r,trim}$=aileron, elevator, and rudder deflection at trim $\delta_{d1,trim}$=flaperon (or other direct-lift device) deflection at trim $\alpha_{ctrl},\beta_{ctrl},\delta_{\tau,ctrl}$=AOA, SA, and throttle setting feedback control $\delta_{a,ctrl},\delta_{e,ctrl},\delta_{r,ctrl}$=aileron, elevator, and rudder deflection feedback control $\delta_{d1,ctrl}$=canard (or other direct-lift device) deflection feedback control $\alpha_{com},\beta_{com},\delta_{\tau,com}$=AOA, SA, and throttle setting command $\overline{\delta}_\tau,\overline{\delta}_{\tau 1}$=nominal throttle for current time-step, nominal throttle at next time step $\alpha_{com},\beta_{com},\delta_{\tau,com} \ \delta_{a,com},\delta_{e,com},\delta_{r,com}$=total aileron, elevator, rudder deflection command $\delta_{d1,com}$=commanded flaperon (or other direct-lift device) deflection $A_{i,k}(t)=\text{diag}([-\alpha_{ijk}(t)])$=linearized state equation coefficient matrix representing desired closed-loop dynamics $K_{Pi},K_{Ii}$=proportional gain matrix, integral gain matrix for $i^{th}$ loop, i=1,2,3,4

$\omega_{n,j}(t)=\sqrt{\alpha_{ij1}(t)}$=time-varying natural frequency of desired dynamics for $i^{th}$ loop, i=1,2,3,4, $j^{th}$ channel, j=1,2,3 (1=roll channel, 2=pitch channel, 3=yaw channel)

$$\zeta_j = \frac{\alpha_{ij2}(t)+\frac{\omega_{n,j}(t)}{\omega_{n,j}(t)}}{2\omega_{n,j}(t)} = \begin{array}{l} \text{constant damping ratio of desired} \\ \text{dynamics for } i^{th} \text{ loop, } j^{th} \text{channel} \end{array}$$

h=altitude $\rho$=air density $Q=(1/2)\rho V_t^2$=dynamic pressure $\omega_{n,diff}$=natural frequency for the pseudo-differentiator $\zeta_{diff}$=damping ratio for the pseudo-differentiator B. Reference Frames The Earth-fixed reference frame $F_E$ with flat-Earth assumptions is considered an inertial frame throughout this detailed description. A position vector in this frame is given as $P=[x_E \ y_E \ z_E]^T$, with positive $x_E$ pointing due north, $y_E$ due east, and $z_E$ toward the center of the Earth. The origin is some fixed point on the Earth's surface P=[0 0 0] that is specified when necessary.

A body-fixed frame of reference is defined with the x-axis pointing forward along and parallel to the fuselage of the aircraft, and the y-axis at 90° along the right (starboard) wing such that the x-z plane is the plane of symmetry of the aircraft. The z-axis points downward to form a right-handed triad. It is assumed that the thrust vector T runs along the x-axis and through the center-of-gravity (cg). A proportional thrust law given by $T_{com}=\delta_\tau T_{max}$ is used for simplicity of exposition, where $\delta_\tau \in [0,1]$ denotes the engine throttle setting and is used as a control effector by the guidance control allocation.

The wind frame of reference is defined with the x-axis parallel to the total velocity vector $V_t$ and the y-axis at 90° along the right (starboard) side of the aircraft. The z-axis remains at all times in the aircraft plane of symmetry, and completes a right-handed coordinate system. The equations of motion (EOM) are integrated in the body frame, and the aerodynamic forces and moments may be calculated in either the wind frame or body frame using appropriate aerodynamic coefficients. Using these reference frames leads to the standard EOM for a rigid-body aircraft.

C. Rotational Dynamics Symbols and Force and Moment Equations

Some intermediate variables used in the EOM for rotational dynamics are defined as follows:

$$I^p_{pq} = I_{xz}(I_{yy} - I_{zz} - I_{xx})D \qquad I^r_{qr} = -\frac{I^p_{pq}}{I_{yy}}$$

$$I^q_{pp} = -\frac{I_{xz}}{I_{yy}} \qquad I^q_{rr} = -I^q_{pp}$$

$$I^r_{pq} = (I_{xx}I_{yy} - I^2_{xz} - I^2_{xx})D \qquad g^p_l = -I_{zz}D$$

$$I^p_{qr} = (I^2_{zz} - I_{yy}I_{zz} + I^2_{xz})D \qquad g^p_n = -I_{xz}D = g^r_l$$

$$I^q_{pr} = \frac{(I_{zz} - I_{zz})}{I_{yy}} \qquad g^q_m = \frac{1}{I_{yy}}$$

$$D = (I^2_{xz} - I_{xx}I_{zz})^{-1} \qquad g^r_n = -I_{xx}D$$

The forces and moments acting on the aircraft are calculated according to standard methods that use dimensionless coefficients obtained from the literature. For stability testing, it is useful to separate the steady-state (trim) and perturbed aerodynamic components of the lift and moment equations as follows:

$$\frac{L}{QS} = C_{L_{\alpha},trim} + C_{L_{\delta e},trim} + C_{L_{\alpha}}|_{\alpha_{trim}}\tilde{\alpha} + C_{L_{\delta e}}|_{\delta e_{trim}}\tilde{\delta}_e + \bar{c}C_{L_{\alpha}}\dot{\tilde{\alpha}} + \bar{c}C_{L_q}\hat{q}$$

$$\frac{D}{QS} = C_{D_{\alpha},trim} + C_{D_{\beta},trim} + C_{D_{\delta a},trim} + C_{D_{\delta e},trim} + C_{D_{\delta r},trim} + C_{D_{\alpha}}|_{\alpha_{trim}}\tilde{\alpha} +$$
$$C_{D_{\beta},trim}|\tilde{\beta} + C_{D_{\delta a}}|_{\delta a_{trim}}\tilde{\delta}_a +$$
$$C_{D_{\delta e}}|_{\delta e_{trim}}\tilde{\delta}_e + C_{D_{\delta r}}|_{?}\tilde{\delta}_r$$

$$\frac{Y}{QS} = C_{y_{\beta},trim} + C_{y_{\delta a},trim} + C_{y_{\delta r},trim} + C_{y_{\beta}}|_{\beta_{trim}}\tilde{\beta} + C_{y_{\delta a}}|_{\delta a_{trim}}\tilde{\delta}_a +$$
$$C_{y_{\delta r}}|_{\delta r_{trim}}\tilde{\delta}_r + bC_{y_p}\hat{p} + bC_{y_r}\hat{r}$$

$$\frac{L_m}{QSb} = C_{l_{\beta},trim} + C_{l_{\delta a},trim} + C_{l_{\delta r},trim} + C_{l_{\beta}}|_{\beta_{trim}}\tilde{\beta} + C_{l_{\delta a}}|_{\delta a_{trim}}\tilde{\delta}_a +$$
$$C_{l_{\delta r}}|_{\delta r_{trim}}\tilde{\delta}_r + bC_{l_p}\hat{p} + bC_{y_r}\hat{r}$$

$$\frac{M_m}{QS\bar{c}} = C_{m_{\alpha},trim} + C_{m_{\delta e},trim} + C_{m_{\alpha}}|_{\alpha_{trim}}\tilde{\alpha} + C_{m_{\delta e}}|_{\delta e_{trim}}\tilde{\delta}_e + \bar{c}C_{m_{\alpha}}\dot{\tilde{\alpha}} + \bar{c}C_{m_q}\hat{q}$$

$$\frac{N_m}{QSb} = C_{n_{\beta},trim} + C_{n_{\delta a},trim} + C_{n_{\delta r},trim} + C_{n_{\beta}}|_{\beta_{trim}}\tilde{\beta} + C_{n_{\delta a}}|_{\delta a_{trim}}\tilde{\delta}_a +$$
$$C_{n_{\delta r}}|_{\delta r_{trim}}\tilde{\delta}_r + bC_{n_p}\hat{p} + bC_{n_r}\hat{r}$$

The trim values for the effector settings, forces, and moments are values used in obtaining the aerodynamic data tables. These constant portions are subtracted from the command prior to control allocation, and allocation is applied only to the perturbation terms. The trim effector settings are then combined with the perturbation terms to obtain the command. For example, the aileron, elevator, and rudder deflections are written as $$\delta_a = \delta_{a,trim} + \tilde{\delta}_a$$

$$\delta_e = \delta_{e,trim} + \tilde{\delta}_e$$

$$\delta_r = \delta_{r,trim} + \tilde{\delta}_r$$

For GA aircraft, typically only one coefficient for $C_{L_{\alpha}}$ or $C_{D_{\alpha}}$ is given at $\alpha=0$, in which case, the above equations can be written more simply as $$D = QS(C_{D_0} + C_{D_{\alpha}} + C_{D_{\beta}}\beta + C_{D_{\delta}}\delta)$$

$$Y = QS\left(C_{y_{\beta}}\beta + C_{y_{\delta r}}\delta_r + \frac{b}{2V_t}(C_{y_p}\hat{p} + C_{y_r}\hat{r})\right)$$

$$L = QS\left(C_{L_o} + C_{L_{\alpha}}\alpha + C_{L_{\delta e}}\delta_e + \frac{\bar{c}}{2V_t}(C_{L_{\alpha}}\dot{\alpha} + C_{L_q}\hat{q})\right)$$

$$L_m = QSb\left(C_{l_{\beta}} + C_{l_{\delta a}}\delta_a + C_{l_{\delta r}}\delta_r + \frac{b}{2V_t}(C_{l_p}\hat{p} + C_{y_r}\hat{r})\right)$$

$$M_m = QS\bar{c}\left(C_{m_o} + C_{m_{\alpha}}\alpha + C_{m_{\delta e}}\delta_e + \frac{\bar{c}}{2V_t}(C_{m_{\alpha}}\dot{\alpha} + C_{m_q}\hat{q})\right)$$

$$N_m = QSb\left(C_{n_{\beta}}\beta + C_{n_{\delta a}}\delta_a + C_{n_{\delta r}}\delta_r + \frac{b}{2V_t}(C_{n_p}\hat{p} + C_{n_r}\hat{r})\right)$$

D. 6DOF TLC Controller Design

The invention provides a 6DOF trajectory tracking TLC flight controller for a fixed-wing aircraft. FIG. 1 schematically represents a basic loop configuration 10 used to construct the TLC architecture. The basic loop 10 includes a closed-loop, linear time-varying (LTV) stabilizing controller 12, a pseudo-inverse plant model 14, and a nonlinear plant model 16.

Nonlinear tracking and decoupling control by trajectory can be viewed as an ideal gain-scheduling controller designed at every point on the trajectory. The trajectory command is embedded in the controller gains by analytical (symbolic) design. As a result, TLC provides robust stability without slowly-varying constraints on the command trajectories, interpolation of controller gains, or trajectory dependent redesigns which may frequently occur in challenging flight operations. The pseudo-inverse plant model in TLC (approximately) cancels the plant nonlinearity in an open-loop fashion, which provides agile tracking response, and reduces the tracking error to facilitate linearization of the nonlinear, time-varying tracking error dynamics for LTV stabilization. Because TLC compensates for the imperfect cancellation, TLC yields more robust performance and stability than LTI controllers based on feedback linearization and dynamic inversion in the loop.

Figure 2:
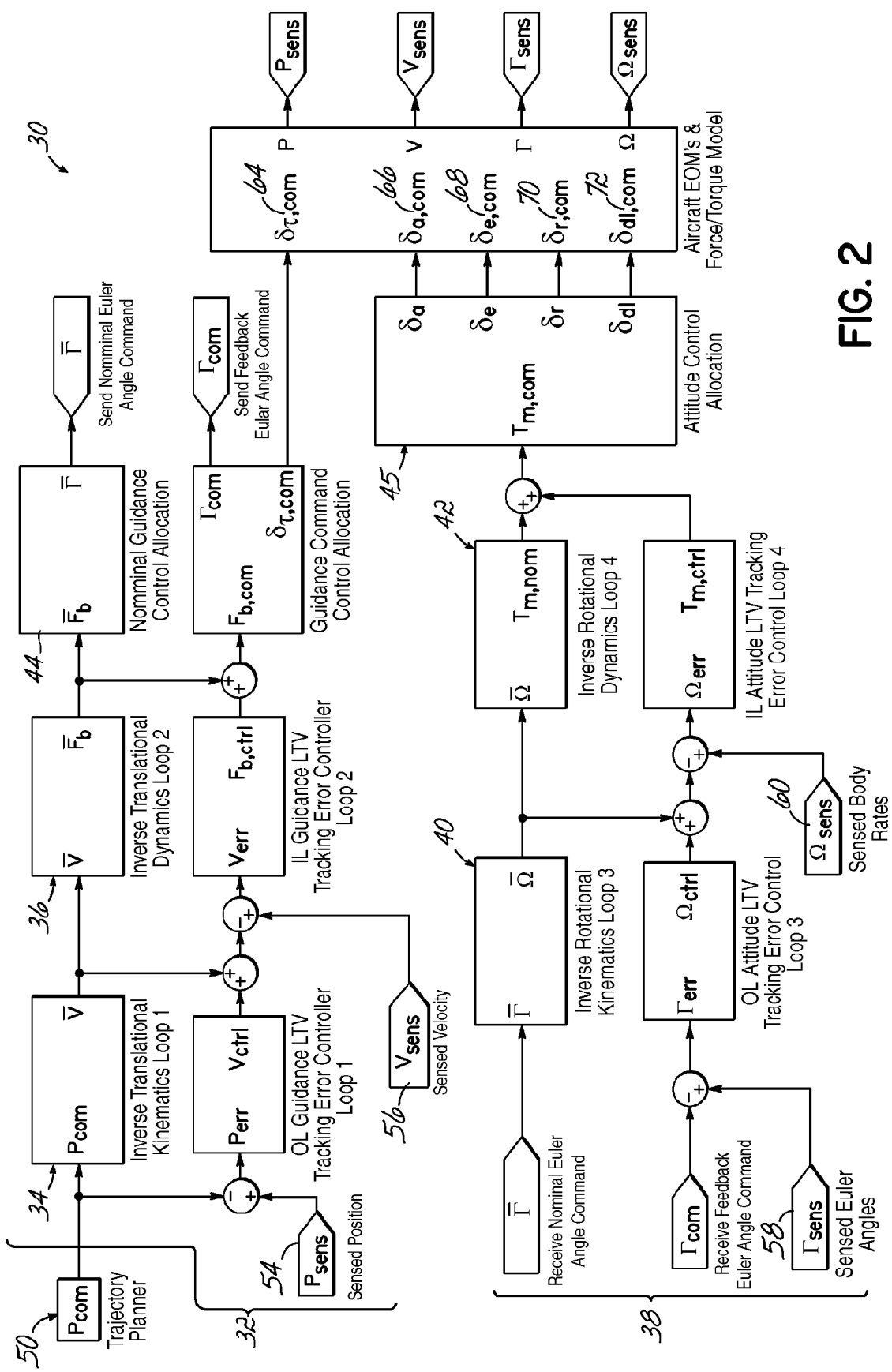
FIG. 2 is a block diagram of a TLC architecture consistent with the invention, including four nested control loops, each of which is modeled from the basic control loop shown in FIG. 1.

As shown in FIG. 2, an implementation of the TLC architecture 30 of the invention includes four nested loops, each of which is modeled from the basic loop 10. The top portion of FIG. 2 is the guidance tracking controller 32, which includes an outer guidance loop 34 and an inner guidance loop 36. The lower portion of FIG. 2 is the attitude tracking controller 38, which includes an outer attitude loop 40 and an inner attitude loop 42. Control allocation is performed separately for the guidance loop to avoid unintended feedback. Advantageously, commands can be inserted in front any of the four nominal controllers. A second-order pseudo-differentiator given by Equation (1) is implemented to realize the derivatives of the nominal states wherever it is needed.

$$G_{diff}(s) = \frac{\omega_{n,diff}^2 s}{s^2 + 2\zeta\omega_{n,diff}s + \omega_{n,diff}^2} \quad (1)$$

The following abbreviated notation in Equation (2) is used in the development below:

$S_{\phi} = \sin \phi \quad C_{\psi} = \cos \psi$ $C_{\phi} = \cos \phi \quad S_{\alpha} = \sin \alpha$ $S_{\theta} = \sin \theta \quad C_{\alpha} = \cos \alpha$ $C_{\theta} = \cos \theta \quad S_{\beta} = \sin \beta$ $S_{\psi} = \sin \psi \quad C_{\beta} = \cos \beta \quad (2)$

1. Guidance Tracking Controller—Outer Loop Control

This section describes the outer guidance loop 34 of the guidance tracking controller 32. The guidance tracking controller 32 calculates the required forces to achieve the desired motion, and provides control allocation commands to the attitude tracking controller 38 to realize those forces. Starting with the body frame translational kinematics EOM $$\begin{bmatrix} \dot{x}_E \\ \dot{y}_E \\ \dot{z}_E \end{bmatrix} = \begin{bmatrix} C_\theta C_\psi & S_\phi S_\theta C_\psi - C_\phi S_\psi & C_\phi S_\theta C_\psi - S_\phi S_\psi \\ C_\theta S_\psi & S_\phi S_\theta S_\psi + C_\phi C_\psi & C_\phi S_\theta S_\psi - S_\phi C_\psi \\ -S_\theta & S_\phi C_\theta & C_\phi C_\theta \end{bmatrix} \begin{bmatrix} u \\ v \\ w \end{bmatrix} = B_1(\Gamma)V, \quad (3)$$

the nominal body velocity $\overline{V}$ is obtained by dynamic inversion at $(\overline{P},\overline{\Gamma})$ as $$\begin{bmatrix} \overline{u} \\ \overline{v} \\ \overline{w} \end{bmatrix} = \begin{bmatrix} C_{\overline{\theta}}C_{\overline{\psi}} & C_{\overline{\theta}}S_{\overline{\psi}} & -S_{\overline{\theta}} \\ S_{\overline{\phi}}S_{\overline{\theta}}C_{\overline{\psi}} - C_{\overline{\phi}}S_{\overline{\psi}} & S_{\overline{\phi}}S_{\overline{\theta}}S_{\overline{\psi}} + C_{\overline{\phi}}C_{\overline{\psi}} & S_{\overline{\phi}}C_{\overline{\theta}} \\ C_{\overline{\phi}}S_{\overline{\theta}}C_{\overline{\psi}} - S_{\overline{\phi}}S_{\overline{\psi}} & C_{\overline{\phi}}S_{\overline{\theta}}S_{\overline{\psi}} - S_{\overline{\phi}}C_{\overline{\psi}} & C_{\overline{\phi}}C_{\overline{\theta}} \end{bmatrix} \begin{bmatrix} \dot{\overline{x}}_E \\ \dot{\overline{y}}_E \\ \dot{\overline{z}}_E \end{bmatrix}, \quad (4)$$

and is used in the next step of the forward path to calculate nominal force $\overline{F}_b$, the force required to achieve the desired trajectory. The error dynamics are next defined, and an LTV PI controller is synthesized using PD-spectral assignment. The position tracking error is defined as $P_{err}=P_{sens}-P_{com}$, and the error dynamics are given by $\dot{P}_{err}=B_1(\overline{\Gamma})V_{ctrl}$.

The PI control law is written as $$V_{ctrl}=-K_{P1}(t)P_{err}-K_{I1}(t)\int_{t_0}^{t}P_{err}(\tau)d\tau \quad (5)$$

and is calculated symbolically to produce an analytical expression for the controller gains that greatly extends the effective flight envelope compared to conventional gain-scheduling. The PI gain matrices are calculated using PD-spectral assignment as $$K_{I1}(t) = -B_1^{-1}(\overline{\Gamma})A_{1\cdot 1} \quad (6)$$
$$= \begin{bmatrix} \alpha_{111}C_{\overline{\theta}}C_{\overline{\psi}} & \alpha_{121}C_{\overline{\theta}}S_{\overline{\psi}} & -\alpha_{131}S_{\overline{\theta}} \\ \alpha_{111}(S_{\overline{\phi}}S_{\overline{\theta}}C_{\overline{\psi}} - C_{\overline{\phi}}S_{\overline{\psi}}) & \alpha_{121}(S_{\overline{\phi}}S_{\overline{\theta}}S_{\overline{\psi}} + C_{\overline{\phi}}C_{\overline{\psi}}) & \alpha_{131}S_{\overline{\phi}}C_{\overline{\theta}} \\ \alpha_{111}(C_{\overline{\phi}}S_{\overline{\theta}}C_{\overline{\psi}} - S_{\overline{\phi}}S_{\overline{\psi}}) & \alpha_{121}(C_{\overline{\phi}}S_{\overline{\theta}}S_{\overline{\psi}} - S_{\overline{\phi}}C_{\overline{\psi}}) & \alpha_{131}C_{\overline{\phi}}C_{\overline{\theta}} \end{bmatrix}$$

$$K_{P1}(t) = -B_1^{-1}(\overline{\Gamma})A_{1\cdot 2} \quad (7)$$
$$= \begin{bmatrix} \alpha_{112}C_{\overline{\theta}}C_{\overline{\psi}} & \alpha_{122}C_{\overline{\theta}}S_{\overline{\psi}} & -\alpha_{132}S_{\overline{\theta}} \\ \alpha_{112}(S_{\overline{\phi}}S_{\overline{\theta}}C_{\overline{\psi}} - C_{\overline{\phi}}S_{\overline{\psi}}) & \alpha_{122}(S_{\overline{\phi}}S_{\overline{\theta}}S_{\overline{\psi}} + C_{\overline{\phi}}C_{\overline{\psi}}) & \alpha_{132}S_{\overline{\phi}}C_{\overline{\theta}} \\ \alpha_{112}(C_{\overline{\phi}}S_{\overline{\theta}}C_{\overline{\psi}} - S_{\overline{\phi}}S_{\overline{\psi}}) & \alpha_{122}(C_{\overline{\phi}}S_{\overline{\theta}}S_{\overline{\psi}} - S_{\overline{\phi}}C_{\overline{\psi}}) & \alpha_{132}C_{\overline{\phi}}C_{\overline{\theta}} \end{bmatrix},$$

where the $A_{1\cdot k}$ are time-varying controller parameter matrices representing the desired closed-loop dynamics, and the subscripts identify the corresponding control loop.

The PD-eigenvalues are chosen by specifying the desired dynamics as $$\alpha_{ij1}(t) = \omega_{n,j}^2(t), \; \alpha_{ij2}(t) = \zeta_j \omega_{n,j}(t) - \frac{\dot{\omega}_{n,j}(t)}{\omega_{n,j}(t)}. \quad (8)$$

While the current implementation uses fixed eigenvalues for nominal tracking, time-varying bandwidth controller gains may be incorporated to adapt to changing dynamics and flight conditions.

The velocity command is $$V_{com}=\overline{V}+V_{ctrl}. \quad (9)$$

2. Guidance Tracking Controller—Inner Loop Control

This section describes the inner guidance loop 36 of the guidance tracking controller 32. After the outer guidance loop 34 calculation is completed, the nominal control calculation proceeds to inner guidance loop 36 along the forward path, with $\overline{F}_b$ calculated by inverting the translational dynamics equation $$\dot{V} = \begin{bmatrix} 0 & r & -q \\ -r & 0 & p \\ q & -p & 0 \end{bmatrix} V + \frac{1}{m}F = B_2(\Omega)V + \frac{1}{m}F \quad (10)$$

and using the pseudo-differentiator to calculate $\dot{\overline{V}}$. Again inserting all nominal values, the nominal body force is $$\overline{F}_b = m[-B_2^{-1}(\overline{\Omega})\overline{V} + \dot{\overline{V}}] \quad (11)$$

The tracking error dynamics are defined next, with $$\dot{V}_{err} = B_2(\Omega)V_{err} + \frac{1}{m}F_{ctrl}, \quad (12)$$

where $B_2(\overline{\Omega})$ is the matrix in (4) with $\overline{\Omega}=[\overline{p}\;\overline{q}\;\overline{r}]^T$. The LTV stabilizing control law is now written as $$F_{ctrl}=-K_{P2}(t)V_{err}-K_{I2}(t)\int_{t_0}^{t}V_{err}(\tau)d\tau, \quad (13)$$

with the controller gains given as $$K_{P2}(t) = m(A_2(\overline{\Omega}) - A_{2\cdot 2}) = m\begin{bmatrix} \alpha_{212} + C_{x_u} & \overline{r} & -\overline{q} \\ -\overline{r} & \alpha_{222} + C_{y_u} & \overline{p} \\ \overline{q} & -\overline{p} & \alpha_{232} + C_{z_u} \end{bmatrix} \quad (14)$$

$$K_{I2}(t) = -mA_{2\cdot 1} = m\begin{bmatrix} \alpha_{211} & 0 & 0 \\ 0 & \alpha_{221} & 0 \\ 0 & 0 & \alpha_{231} \end{bmatrix}. \quad (15)$$

3. Guidance Control Allocation

As described above, the TLC design separates the force commands into a nominal component $\overline{F}_b$ calculated in the feedforward path, and a feedback control component $F_{ctrl}$ calculated by the LTV tracking error controller. The nominal controller includes a control allocation implementation which calculates the nominal throttle, angle-of-attack, and sideslip angle to achieve the nominal forces. The feedback controller includes an identical control allocation implementation, but in this case the input is the total force command $F_{com}=\overline{F}+F_{ctrl}$.

The nominal guidance control allocation 44 takes $\overline{F}_b$ as input and calculates the virtual controls $\overline{\alpha}_1$ and $\overline{\beta}_1$ as well as the nominal throttle coefficient $\overline{\delta}_{r1}$ to achieve the nominal trajectory, where the subscripts on the aerodynamic angles and thrust indicate the desired values at the next time step. Variables from the previous time step (without numerical subscripts) are used to generate the nominal aerodynamic and thrust commands. The transformation from the wind to the body frame is used frequently in the detailed description, and is given by $$T_{WB}(\alpha, \beta) = \begin{bmatrix} C_\alpha C_\beta & -C_\alpha S_\beta & -S_\alpha \\ S_\beta & C_\alpha & 0 \\ S_\alpha C_\beta & -S_\alpha S_\beta & C_\alpha \end{bmatrix}. \quad (16)$$

The total nominal forces are defined as $$\begin{bmatrix} \overline{F}_x \\ \overline{F}_y \\ \overline{F}_z \end{bmatrix} = \begin{bmatrix} \overline{F}_{x,a} + \overline{T} \\ \overline{F}_{y,a} \\ \overline{F}_{z,a} \end{bmatrix} + \begin{bmatrix} \overline{F}_{x,g} \\ \overline{F}_{y,g} \\ \overline{F}_{z,g} \end{bmatrix}, \quad (17)$$

where $\overline{F}_g$ is the gravitational force evaluated at $\overline{\Gamma}$. Referring to equation (11), it is noted that the term $-m\overline{q}\overline{u}$ is not included when allocating $\overline{F}_z$ to $\overline{\alpha}_1$ in order to avoid and unstable feedback loop. As shown below, this force can be allocated to a direct-lift control effector if one is available. Equation (16) is evaluated at $(\overline{\alpha},\overline{\beta})$ as calculated at the previous time-step, and is used to write the aerodynamic forces in the wind frame as $$\begin{bmatrix} \overline{F}_x - \overline{F}_{x,g} \\ \overline{F}_y - \overline{F}_{y,g} \\ \overline{F}_z - \overline{F}_{z,g} \end{bmatrix} = \overline{T}_{WB}(\overline{\alpha}, \overline{\beta}) \begin{bmatrix} -(\overline{D} + D_{trim}) + \overline{T}\cos\overline{\alpha} \\ -\overline{C} \\ -(\overline{L} + L_{trim}) - \overline{T}\sin\overline{\alpha} \end{bmatrix}. \quad (18)$$

The aerodynamic trim terms can be moved over to the left side after transformation to the body frame so that Equation (18) becomes $$\begin{bmatrix} \overline{F}_x - \overline{F}_{x,g} - F_{x,a,trim} \\ \overline{F}_y - \overline{F}_{y,g} \\ \overline{F}_z - \overline{F}_{z,g} - F_{z,a,trim} \end{bmatrix} = \overline{T}_{WB}(\overline{\alpha}, \overline{\beta}) \begin{bmatrix} -\overline{D} + \overline{T}\cos\overline{\alpha} \\ -\overline{C} \\ -\overline{L} - \overline{T}\sin\overline{\alpha} \end{bmatrix}. \quad (19)$$

Equation (19) is further modified by writing out the gravity terms, expanding the forces on the right, and inserting the nominal values to yield Equation (20)

$$\begin{bmatrix} \overline{F}_x + mgS_{\overline{\theta}} - F_{x,a,trim} \\ \overline{F}_y - mgS_{\overline{\phi}}C_{\overline{\theta}} - F_{y,a,trim} \\ \overline{F}_z - mgC_{\overline{\phi}}C_{\overline{\theta}} - F_{z,a,trim} \end{bmatrix} = \quad (20)$$

$$\overline{T}_{WB}(\overline{\alpha}, \overline{\beta}) \begin{bmatrix} -QSC_{D_\alpha}\overline{\alpha}_1 - QSC_{D_\beta}\overline{\beta}_1 + T_{max}\overline{\delta}_{\tau 1}\cos\overline{\alpha} \\ -QSC_{y_\beta}\overline{\beta}_1 - QSC_{y_{\delta_a}}\overline{\delta}_a - QSC_{y_{\delta_r}}\overline{\delta}_r \\ -QSC_{L_\alpha}\overline{\alpha}_1 - C_{L_{\delta_e}}\overline{\delta}_e - T_{max}\overline{\delta}_{\tau 1}\sin\overline{\alpha} \end{bmatrix},$$

where $\overline{T}$ has been replaced by $T_{max}\overline{\delta}_{\tau 1}$, and the drag due to the control effectors has been neglected for simplicity of exposition. Transforming both sides of Equation (20) to the wind frame, and keeping only terms that include the nominal commands on the right-hand side, the Jacobian at nominal values at the previous time-step can be defined as $$J(\overline{\alpha}, \overline{\beta}) = \begin{bmatrix} -QSC_{D_\alpha} & -QSC_{D_\beta} & T_{max}\cos\overline{\alpha} \\ 0 & -QSC_{y_\beta} & 0 \\ -QSC_{L_\alpha} & 0 & -T_{max}\sin\overline{\alpha} \end{bmatrix}, \quad (21)$$

The terms $QSC_{L_{\delta_e}}\delta_e$ and $QSC_{y_{\delta_r}}\delta_r$ in Equation (20) were dropped from Equation (21) because of the non-minimum phase zero dynamics in the pitch and yaw channels. A positive elevator deflection is required to generate a pitch-up moment to increase angle-of-attack (and thus lift), but such a deflection causes a temporary decrease in lift. The yaw channel behavior is analogous, as rudder deflection will generate a momentary side force opposite to the command. This behavior cannot be removed with feedback control and, therefore, must be tolerated unless a direct-lift control effector such as a canard is employed (see Equation (38)). The nominal controls at the next time step are calculated by first writing $$\overline{T}_{WB}(\overline{\alpha}, \overline{\beta})\begin{bmatrix} \overline{F}_x + mgS_{\overline{\theta}} - F_{x,a,trim} \\ \overline{F}_y - mgS_{\overline{\phi}}C_{\overline{\theta}} - F_{y,a,trim} \\ \overline{F}_z - mgC_{\overline{\phi}}C_{\overline{\theta}} - F_{z,b,trim} \end{bmatrix} - \begin{bmatrix} 0 \\ QSC_{y_{\delta_a}}\delta_a \\ 0 \end{bmatrix} = J(\overline{\alpha},\overline{\beta})\begin{bmatrix} \overline{\alpha}_1 \\ \overline{\beta}_1 \\ \overline{\delta}_{\tau 1} \end{bmatrix}, \quad (22)$$

and then inverting Jacobian, $J(\overline{\alpha},\overline{\beta})$, to obtain $$\begin{bmatrix} \overline{\alpha}_1 \\ \overline{\beta}_1 \\ \overline{\delta}_{\tau 1} \end{bmatrix} = J^{-1}(\overline{\alpha}, \overline{\beta}) \quad (23)$$

$$\left\{ \begin{bmatrix} C_\alpha C_{\overline{\beta}} & -C_\alpha S_{\overline{\beta}} & -S_\alpha \\ S_{\overline{\beta}} & C_\alpha & 0 \\ S_\alpha C_{\overline{\beta}} & -S_\alpha S_{\overline{\beta}} & C_\alpha \end{bmatrix} \begin{bmatrix} \overline{F}_x + mgS_{\overline{\theta}} \\ -mgS_{\overline{\phi}}C_{\overline{\theta}} \\ \overline{F}_z - mgC_{\overline{\phi}}C_{\overline{\theta}} \end{bmatrix} - \begin{bmatrix} 0 \\ QSC_{y_{\delta_a}}\delta_a \\ 0 \end{bmatrix} \right\},$$

A bank-to-turn (BTT) approach is adopted in this design so that the side force due to centripetal acceleration is created by rolling the aircraft and aligning the lift vector to create the required centripetal force. Therefore, the term $\overline{F}_y$ in Equation (22) is dropped from (23), and only the gravitational force due to non-zero roll angle is allocated to $\overline{\beta}_1$.

The nominal roll angle is derived from the trajectory command and nominal aerodynamic angles, and is given by $$\hat{\phi} = \tan^{-1}\left(\Upsilon_{com}\frac{\cos\overline{\beta}}{\cos\overline{\alpha}}\frac{(a-b^2) + b\tan\overline{\alpha}\sqrt{c(1-b^2) + \Upsilon_{com}^2\sin^2\overline{\beta}}}{a^2 - b^2(1 + c\tan^2\overline{\alpha})}\right), \quad (24)$$

where $$a = 1 - \Upsilon_{com}\tan\overline{\alpha}\sin\overline{\beta}, \; b = \frac{\sin\gamma_{com}}{\cos\overline{\beta}}, \; c = 1 + \Upsilon_{com}^2\cos^2\overline{\beta}$$

and $$\Upsilon_{com} \equiv \frac{\dot{\chi}_{com}V_{T,com}}{g}.$$

The nominal pitch, bank, and yaw angles are calculated next as $$\hat{\theta} = \tan^{-1}\frac{ab + \sin\gamma_{com}\sqrt{a^2 - \sin^2\gamma_{com} + b^2}}{a^2 - \sin^2\gamma_{com}}, \hat{\theta} \neq \pm\frac{\pi}{2} \quad (25)$$

where $a=\cos\bar{\alpha}_1 \cos\bar{\beta}_1$, $b=\sin\phi_{com}\sin\bar{\beta}_1+\cos\phi_{com}\sin\bar{\alpha}_1\cos\bar{\beta}_1$, $$\hat{\sigma} = \tan^{-1}\left(\frac{\bar{u}\bar{v}\sin\hat{\theta} + (\bar{u}^2 + \bar{w}^2)\sin\phi_{com}\cos\hat{\theta} - \bar{v}\bar{w}\cos\phi_{com}\cos\hat{\theta}}{V_{t,com}(\bar{w}\sin\hat{\theta} + \bar{u}\cos\phi_{com}\cos\hat{\theta})}\right)$$

$$\hat{\psi} = \tan^{-1}\left\{\frac{(S_{\hat{\sigma}}S_{\bar{\alpha}} - C_{\bar{\alpha}}C_{\hat{\sigma}}S_{\bar{\beta}})C_{\chi_{com}} +}{[C_{\gamma_{com}}C_{\bar{\alpha}}C_{\bar{\beta}} - S_{\gamma_{com}}(S_{\bar{\alpha}}C_{\hat{\sigma}} + S_{\bar{\beta}}C_{\bar{\alpha}}S_{\hat{\sigma}})]S_{\chi_{com}}}\\ \frac{-(S_{\hat{\sigma}}S_{\bar{\alpha}} - C_{\bar{\alpha}}C_{\hat{\sigma}}S_{\bar{\beta}})S_{\chi_{com}} +}{[C_{\gamma_{com}}C_{\bar{\alpha}}C_{\bar{\beta}} - S_{\gamma_{com}}(S_{\bar{\alpha}}C_{\hat{\sigma}} + S_{\bar{\beta}}C_{\bar{\alpha}}S_{\hat{\sigma}})]C_{\chi_{com}}}\right\}.$$

To calculate the feedback virtual control for the guidance loops 34, 36, the nominal control allocation procedure is repeated using $F_{com}$ as input. We thus obtain the $[\alpha_{com}\ \beta_{com}\ \delta_{\tau,com}]^T$ by Equation (23) with the $\Gamma$ replaced by $\Gamma_{com} = \bar{\Gamma} + \Gamma_{ctrl}$ and $\bar{\alpha}, \bar{\beta}$ replaced by $\alpha_{com}, \beta_{com}$, and obtain $\theta_{com}$ and $\psi_{com}$ with similar modifications.

4. Attitude Tracking Controller—Outer Loop Control

The attitude tracking controller 38 calculates the moments necessary to generate the forces commanded by the guidance loops 34, 36, and performs control allocation among the control surfaces to effect those moments.

This section describes the outer attitude loop 40 of the attitude tracking controller 38. Outer loop nominal attitude control begins with dynamic inversion of the rotational kinematics equations $$\dot{\Gamma} = \begin{bmatrix}\dot{\phi}\\ \dot{\theta}\\ \dot{\psi}\end{bmatrix} = \begin{bmatrix}1 & S_\phi S_\theta/C_\theta & S_\theta C_\phi/C_\theta\\ 0 & C_\phi & -S_\phi\\ 0 & S_\phi/C_\theta & C_\phi/C_\theta\end{bmatrix}\begin{bmatrix}p\\ q\\ r\end{bmatrix} = B_2(\Gamma)\Omega. \quad (26)$$

After inserting $\Gamma$ and $\dot{\Gamma}$ (as calculated by the pseudo-differentiator), the nominal body rates are obtained as $$\bar{\Omega} = B_2^{-1}(\Gamma)\dot{\Gamma} \quad (27)$$

The PI control law for the outer-loop PI controller is then written as $$\Omega_{ctrl} = -K_{P3}(t)\Gamma_{err} - K_{I3}(t)\int_{t_0}^{t}\Gamma_{err}(\sigma)d\sigma \quad (28)$$

and the controller gains are synthesized using PD-spectral assignment as $$K_{P3}(t) = \begin{bmatrix}\alpha_{312} & \bar{q}S_{\bar{\phi}} + \bar{r}C_{\bar{\phi}} & -\alpha_{332}S_{\bar{\theta}}\\ -\bar{r} & \alpha_{322}C_{\bar{\phi}} + (S_{\bar{\theta}}[\bar{q}S_{\bar{\phi}} + \bar{r}C_{\bar{\phi}}]S_{\bar{\phi}}/C_{\bar{\theta}}) & \alpha_{332}S_{\bar{\phi}}C_{\bar{\theta}}\\ \alpha_{112}(C_{\bar{\phi}}S_{\bar{\theta}}C_{\bar{\psi}} - S_{\bar{\phi}}S_{\bar{\psi}}) & -\alpha_{322}S_{\bar{\phi}} + (S_{\bar{\theta}}[\bar{q}S_{\bar{\phi}} + \bar{r}C_{\bar{\phi}}]S_{\bar{\phi}}/C_{\bar{\theta}}) & \alpha_{332}C_{\bar{\phi}}C_{\bar{\theta}}\end{bmatrix} \quad (29)$$

$$K_{I3}(t) = \begin{bmatrix}\alpha_{111} & 0 & -\alpha_{331}S_{\bar{\theta}}\\ 0 & -\alpha_{321}C_\phi & \alpha_{331}S_{\bar{\phi}}C_{\bar{\theta}}\\ 0 & -\alpha_{321}S_{\bar{\phi}} & \alpha_{331}C_{\bar{\phi}}C_{\bar{\theta}}\end{bmatrix}. \quad (30)$$

The nominal body-rate command is then given as $\Omega_{com} = \bar{\Omega} + \Omega_{ctrl}$.

5. Attitude Tracking Controller—Inner Loop Control

This section describes the inner attitude loop 42 of the attitude tracking controller 38. Inner loop control starts with dynamic inversion of the rotational dynamics equations (see Section C)

$$\dot{\Omega} = \begin{bmatrix}I^p_{pq}pq + I^p_{pr}qr\\ I^q_{pp}p^2 + I^q_{rr}r^2 + I^q_{pr}pr\\ I^r_{pq}pq + I^r_{qr}qr\end{bmatrix} + \begin{bmatrix}g^p_l & 0 & g^p_n\\ 0 & g^q_m & 0\\ g^r_l & 0 & g^r_n\end{bmatrix}T_m \quad (31)$$

at the nominal values of all variables $$\bar{L}_m = I_{xx}\dot{\bar{p}} + (I_{zz} - I_{yy})\bar{q}\bar{r} - I_{xz}(\dot{\bar{r}} - \bar{q}\bar{p}) - L_p\bar{p} - L_r\bar{r}$$

$$\bar{M}_m = I_{yy}\dot{\bar{q}} + (I_{xx} - I_{zz})\bar{r}\bar{p} + I_{xa}(\bar{p}^2 - \bar{r}^2) - M_q\bar{q}$$

$$\bar{N}_m = I_{zz}\dot{\bar{r}} + (I_{yy} - I_{xx})\bar{q}\bar{p} - I_{xz} + + I_{xa}(\bar{q}\bar{r} - \dot{\bar{p}}) - N_p\bar{p} - N_r\bar{r}. \quad (32)$$

The PI control law is calculated next as $$T_{m,ctrl} = -K_{P4}(t)\Omega_{err} - K_{I4}\int_{t_0}^{t}\Omega_{err}(\sigma)d\sigma, \quad (33)$$

and the controller gains are synthesized as $$K_{P4} = \begin{bmatrix} I_{xx}(\alpha_{412} + I^p_{pq}\bar{q}) - I^r_{pq}I_{xz}\bar{q} + L_p & I_{xx}(I^p_{pq}\bar{p} + I^p_{pr}\bar{r}) - I_{xz}(I^r_{pq}\bar{p} + I^r_{qr}\bar{r}) & I_{xx}I^p_{qr}\bar{q} - I_{xz}(I^r_{qr}\bar{q} + \alpha_{432}) + L_r \\ I_{yy}(2I^q_{pp}\bar{p} + I^q_{pr}\bar{r}) & \alpha_{422}I_{yy} + M_q & I_{yy}(2I^q_{rr}\bar{r} + I^q_{pr}\bar{p}) \\ -I_{xz}(I^p_{pq}\bar{q} + \alpha_{412}) + I_{zz}I^r_{pq}\bar{q} + N_p & -I_{xz}(I^p_{pq}\bar{p} + I^p_{qr}\bar{r}) + I_{zz}(I^r_{pq}\bar{p} + I^r_{qr}\bar{r}) & -I_{xz}I^p_{qr}\bar{q} + I_{zz}(I^r_{qr}\bar{q} + \alpha_{432}) + N_r \end{bmatrix} \quad (34)$$

$$K_{I4} = \begin{bmatrix} I_{xx}\alpha_{411} & 0 & -I_{xz}\alpha_{431} \\ 0 & I_{yy}\alpha_{221} & 0 \\ -I_{xz}\alpha_{411} & 0 & I_{zz}\alpha_{431} \end{bmatrix}. \quad (35)$$

The output of the attitude controller is $T_{m,com} = T_m + T_{m,ctrl}$.

6. Attitude Control Allocation

Attitude control allocation 45 is performed by inverting the moment model at $T_{m,com}$, $\bar{\alpha}$, and $\bar{\beta}$, and need not be performed separately for nominal and feedback components since no unwanted feedback would result. The moment equations can be written in terms of the Jacobian as $$L_{m,com} - L_{m,trim} = QSb(C_{l_\beta}\bar{\beta}_1 + C_{l_{\delta a}}\delta_{a,com} + C_{l_{\delta r}}\delta_{r,com})$$

$$M_{m,com} - M_{m,trim} = QS\bar{c}(C_{m_\alpha}\bar{\alpha}_1 + C_{m_{\delta e}}\delta_{e,com})$$

$$N_{m,com} - M_{m,trim} = QSb(C_{n_\beta}\bar{\beta}_1 + C_{n_{\delta a}}\delta_{a,com} + C_{n_{\delta r}}\delta_{r,com}), \quad (36)$$

then inverted to obtain effector commands as $$\begin{bmatrix} \delta_{a,com} \\ \delta_{e,com} \\ \delta_{r,com} \end{bmatrix} = \begin{bmatrix} QSbC_{l_{\delta a}} & 0 & QSbC_{l_{\delta r}} \\ 0 & QS\bar{c}C_{m_{\delta e}} & 0 \\ QSbC_{n_{\delta a}} & 0 & QSbC_{n_{\delta r}} \end{bmatrix}^{-1} \begin{bmatrix} L_{m,com} - QSbC_{l_\beta}\bar{\beta} \\ M_{m,com} - QSbC_{m_\alpha}\bar{\alpha} \\ N_{m,com} - QSbC_{n_\beta}\bar{\beta} \end{bmatrix} = J^{-1}\begin{bmatrix} L_{m,com} - QSbC_{l_\beta}\bar{\beta}_1 \\ M_{m,com} - QSbC_{m_\alpha}\bar{\alpha}_1 \\ N_{m,com} - QSbC_{n_\beta}\bar{\beta}_1 \end{bmatrix}. \quad (37)$$

If a direct-lift control effector such as a flaperon or canard (plus elevator) is employed, then Equation (37) can be written $$\begin{bmatrix} \delta_{a,com} \\ \delta_{e,com} \\ \delta_{r,com} \\ \delta dl_{com} \end{bmatrix} = \begin{bmatrix} QSbC_{l_{\delta a}} & 0 & QSbC_{l_{\delta r}} & 0 \\ 0 & QS\bar{c}C_{m_{\delta e}} & 0 & 0 \\ QSbC_{n_{\delta a}} & 0 & QSbC_{n_{\delta r}} & 0 \\ 0 & 0 & 0 & QSbC_{L_{\delta dl}} \end{bmatrix}^{-1} = J^{-1}\begin{bmatrix} L_{m,com} - QSbC_{l_\beta}\bar{\beta}_1 \\ M_{m,com} - QS\bar{c}C_{m_\alpha}\bar{\alpha}_1 \\ N_{m,com} - QSbC_{n_\beta}\bar{\beta}_1 \\ QSC_{L_{\delta e}} - m\bar{q}\bar{u} \end{bmatrix}. \quad (38)$$

where the coefficient $C_{L_{\delta dl}}$ is determined by the physical arrangement of the effector.

E. Implementing the TLC Architecture

Figure 5:
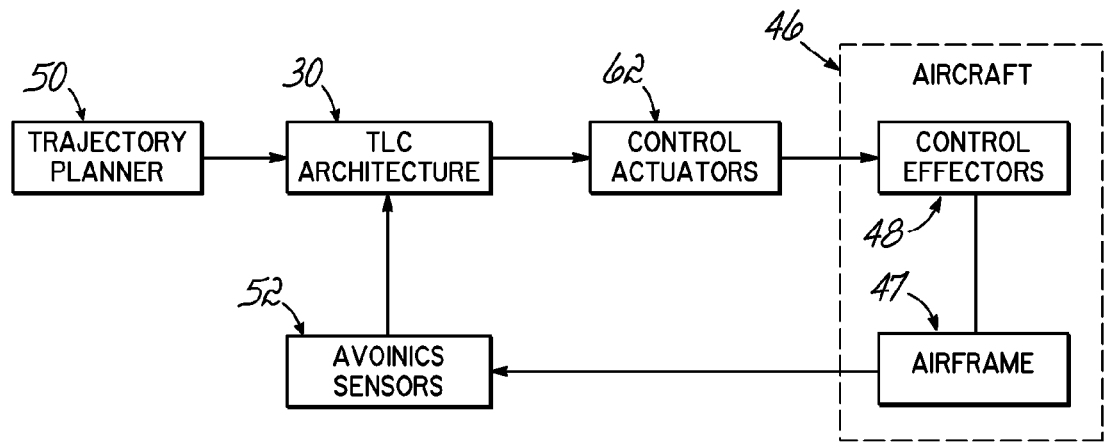
FIG. 5 is a block diagram of the TLC architecture of FIG. 2 implemented for a fixed-wing aircraft.
Figure 6:
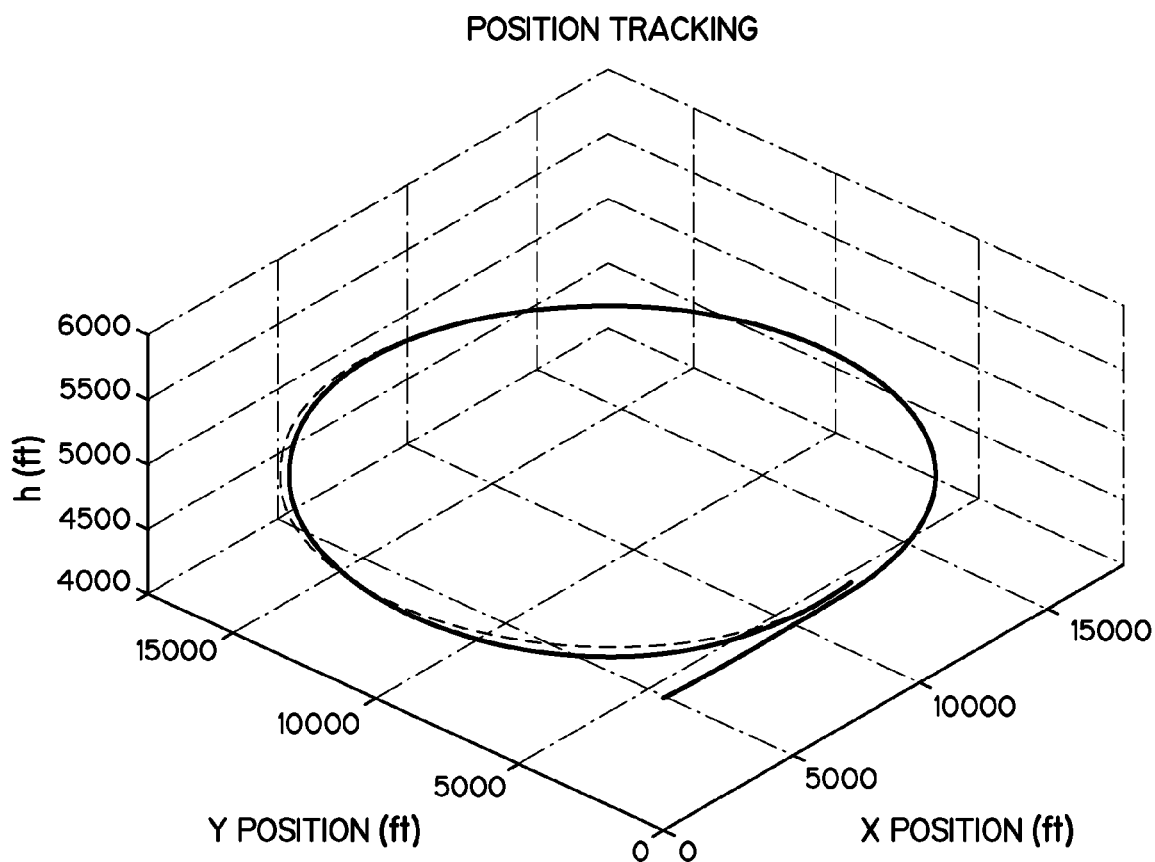
FIG. 6 is a graph of the position tracking showing commanded and sensed position data from the Design Verification Example.
Figure 7A:
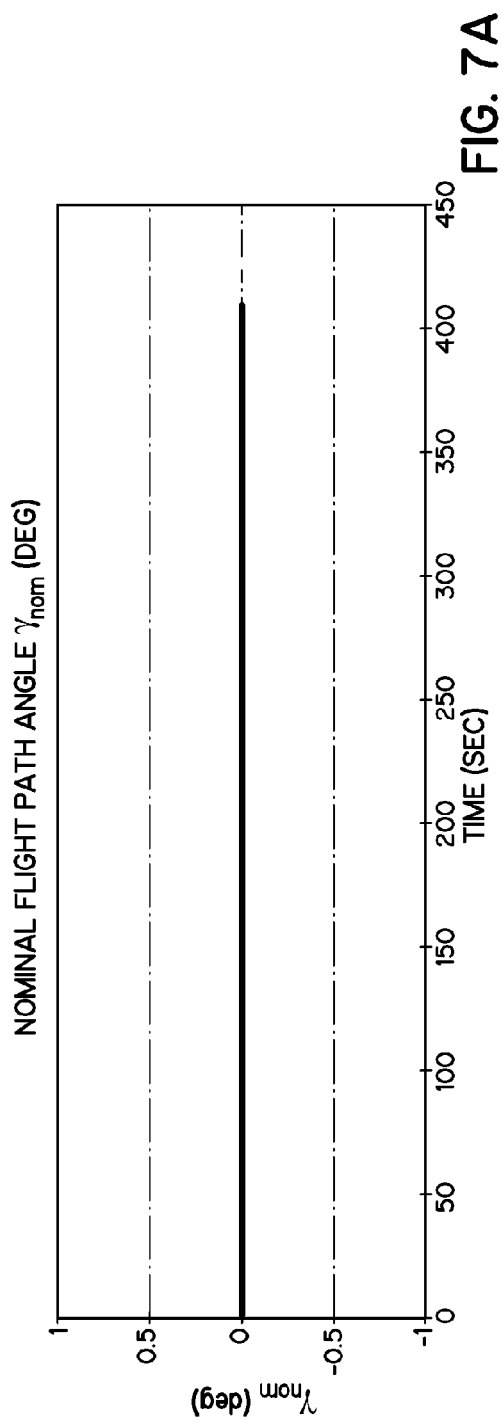
FIG. 7a is a graph of the commanded flight path for the Design Verification Example.
Figure 7B:
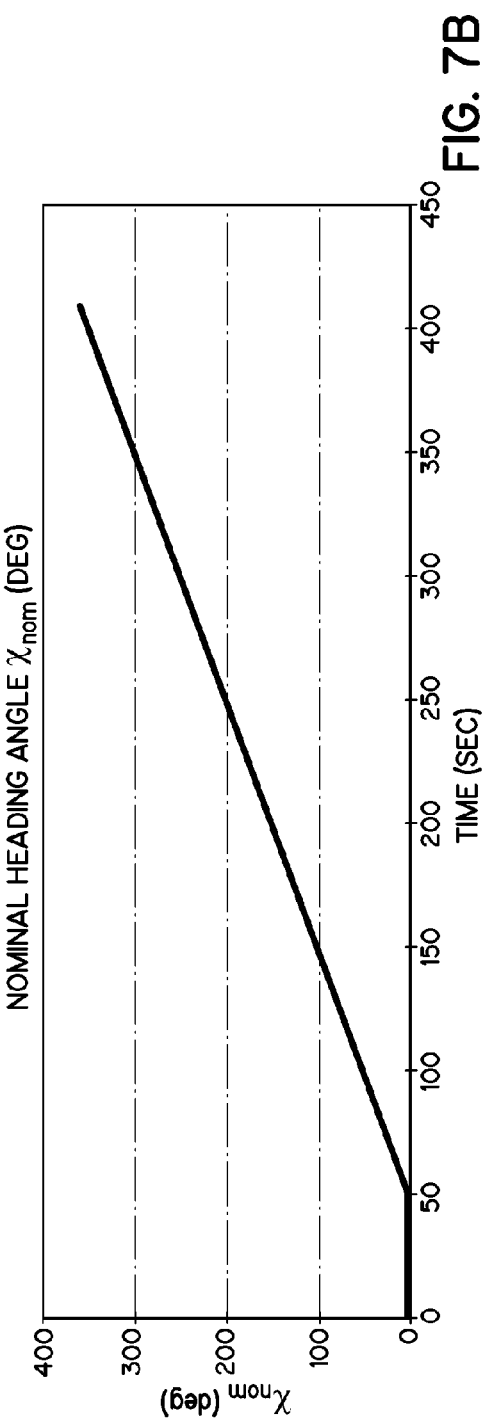
FIG. 7b is a graph of the commanded heading for the Design Verification Example.

In use, the TLC architecture 30 may be used to control an aircraft. FIG. 5 illustrates an example of how the TLC architecture 30 may be implemented in an aircraft 46, such as, but not limited to a Cessna 182. The aircraft 46 includes an airframe 47 and a collection of control effectors 48, such as ailerons, rudders, elevators, and a throttle control. Optionally, the control effectors 48 could further include flaperons, a canard, or a vectored thrust nozzle.

A trajectory planner 50 (see also FIG. 2) provides command signals to the TLC architecture 30. The trajectory planner 50 stores or calculates in real time the desired trajectory, i.e., the x, y, and z position, of the aircraft at any given time during the flight. Thus, in one example, the aircraft is to fly from Point A to Point B, but avoid any no-fly zones between those two points. The trajectory planner 50 would then send as input signals to the TLC architecture 30 the desired trajectory as commanded x, y, and z coordinates to fly from Point A to Point B, avoiding any no-fly zones along the way. Depending on the configuration of the trajectory planner 50, it may send a commanded heading, flight path, and altitude to the TLC architecture 30 instead of commanded x, y, and z coordinates.

During the flight, a collection of avionics sensors 52 sends various "sensed" parameters to the TLC architecture 30. For example, the avionics sensors 52 senses the x, y, and z coordinates of the aircraft 48, the velocity, the Euler angles (F), the angular velocities (Ω), and the dynamic pressure (Q). Each of those sensed parameters is fed into the TLC architecture 30. The sensed position, velocity, Euler angles, and angular velocities are fed into the TLC architecture 30 at points 54, 56, 58, and 60 respectively in FIG. 2. The avionics sensors 52 are known in the aviation field, such as pitot tubes, Global Positioning Systems (GPS), Inertial Measurement Units (IMU), and the like.

When the TLC architecture 30 receives the sensed parameters, an apparatus 100 (FIG. 12) compares those sensed parameters with the commanded parameters received from the trajectory planner 50 and determines if there are deviations and the magnitude of the deviations. When the TLC architecture 30 detects deviations from the commanded signals, the apparatus 100 programmed with the control algorithm discussed in Section D calculates the appropriate changes that must be made to the aircraft's ailerons, rudder, elevator, and throttle in order to return the aircraft 46 to the commanded trajectory. Once calculated, the TLC architecture 30 and apparatus 100 sends one or more "delta" signals to control actuators 62 which then sends appropriate signals to one or more control effectors 48 to incrementally change the position of those control effectors 48. The delta signals from the TLC architecture 30 for the aircraft's throttle, ailerons, elevator, rudder, and direct lift shown at 64, 66, 68, 70, and 72, respectively, in FIG. 2.

The incremental changes to the position of one or more of the aircraft's ailerons, rudder, elevator, and throttle will cause the airframe 47 to change one or more of its x, y, and z coordinates, velocity, Euler angles, angular velocities, and dynamic pressure so that the aircraft 46 will remain on the desired trajectory. Changes in any one of those parameters will be sensed by the avionics sensors 52. As mentioned above, those sensed parameters will be fed into the TLC architecture 30 and checked against the commanded trajectory parameters coming from the trajectory planner 50. If deviations are detected between the new commanded trajectory parameters and the new sensed parameters, the TLC architecture and apparatus 100 again calculates one or more new delta signals for the control actuators 62. The looping process continues throughout the entire flight path with the goal of keeping the aircraft 46 on the planned trajectory.

Figure 12:
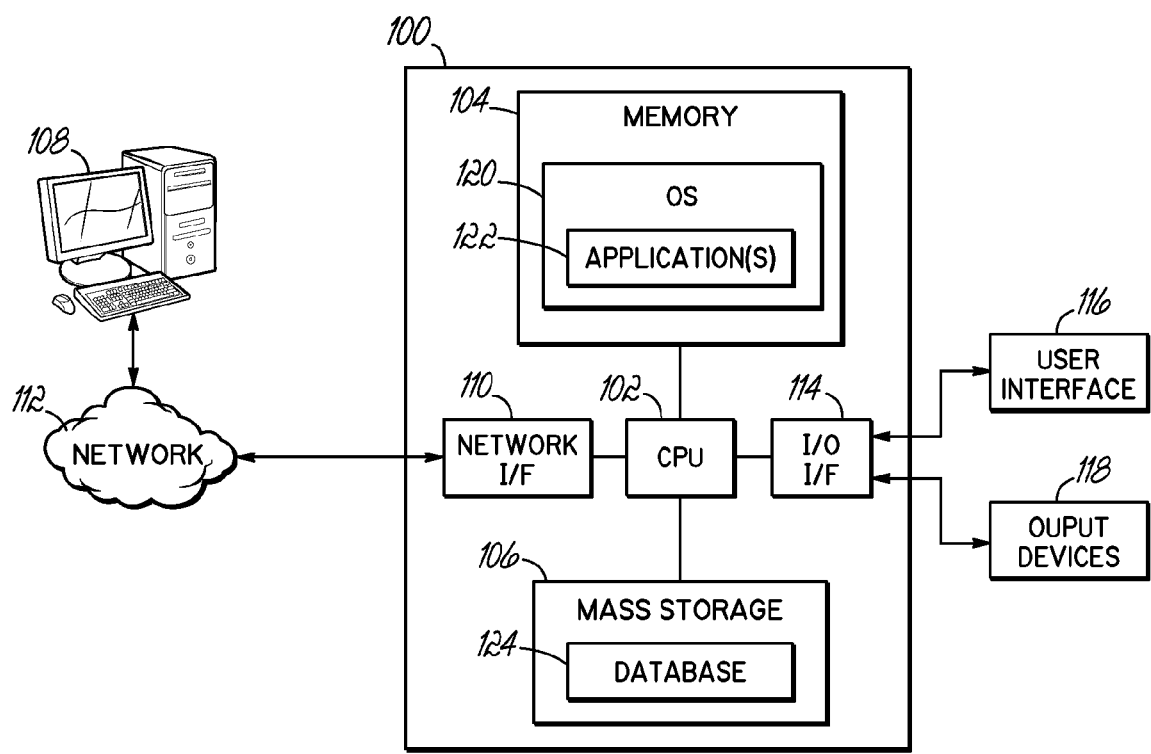
FIG. 12 is a diagrammatic illustration of a hardware and software environment for an apparatus configured to implement the TLC architecture of FIG. 2 consistent with embodiments of the invention.

By way of further explanation of apparatus 100, FIG. 12 is a diagrammatic illustration of a hardware and software environment for where apparatus 100 is configured to implement the TLC architecture 30 consistent with embodiments of the invention. Apparatus 100, in specific embodiments, may be a general purpose processor, application specific integrated circuit (ASIC), field programmable gate array (FPGA), computer, computer system, computing device, server, disk array, or programmable device such as a multi-user computer, a single-user computer, a handheld computing device, a networked device (including a computer in a cluster configuration), a mobile telecommunications device, etc. Apparatus 100 may be referred to as "computing apparatus," but will be referred to herein as a "general purpose processor."

The computing apparatus 100 includes at least one central processing unit ("CPU") 102 coupled to a memory 104. Each CPU 102 is typically implemented in hardware using circuit logic disposed on one or more physical integrated circuit devices or chips. Each CPU 102 may be one or more microprocessors, micro-controllers, field programmable gate arrays, or ASICs, while memory 104 may include random access memory (RAM), dynamic random access memory (DRAM), static random access memory (SRAM), flash memory, and/or another digital storage medium, and also typically implemented using circuit logic disposed on one or more physical integrated circuit devices, or chips. As such, memory 104 may be considered to include memory storage physically located elsewhere in the computing apparatus 100, e.g., any cache memory in the at least one CPU 102, as well as any storage capacity used as a virtual memory, e.g., as stored on a mass storage device 106, another computing system 108, coupled to computer 100 through at least one network interface 110 (illustrated as, and hereinafter, "network I/F" 110) by way of at least one network 112. Similarly to the computing system 10, computing system 108, in specific embodiments, is a computer, computer system, computing device, server, disk array, or programmable device such as a multi-user computer, a single-user computer, a handheld computing device, a networked device (including a computer in a cluster configuration), a mobile telecommunications device, etc.

The computing apparatus 100 is coupled to at least one peripheral device through an input/output device interface 114 (illustrated as, and hereinafter, "I/O I/F" 114). In particular, the CPU 102 receives data from a user through at least one user interface 116 (including, for example, a keyboard, mouse, a microphone, and/or other user interface) and/or outputs data to the user through at least one output device 118 (including, for example, a display, speakers, a printer, and/or another output device). Moreover, in some embodiments, the I/O I/F 114 communicates with a device that is operative as a user interface 116 and output device 118 in combination, such as a touch screen display (not shown).

The computing apparatus 100 is typically under the control of an operating system 120 and executes or otherwise relies upon various computer software applications, sequences of operations, components, programs, files, objects, modules, etc., consistent with embodiments of the invention. In specific embodiments, the computing apparatus 100 executes or otherwise relies on an application 122 to manage user and/or client data, as well as generate a video presentation consistent with embodiments of the invention. Moreover, and in specific embodiments, the computing apparatus 100 is configured with a database 124 to store data about users, clients, and/or other data associated with the video presentation consistent with embodiments of the invention.

The routines executed to implement the embodiments of the invention, whether implemented as part of an operating system or a specific application, component, program, object, module or sequence of instructions executed by one or more computing systems will be referred to herein as a "sequence of operations," a "program product," or, more simply, "program code." The program code typically comprises one or more instructions that are resident at various times in various memory and storage devices in a computing system, and that, when read and executed by one or more processors of the computing system, cause that computing system to perform the steps necessary to execute steps, elements, and/or blocks embodying the various aspects of the invention.

While the invention has been described in the context of fully functioning computing systems, those skilled in the art will appreciate that the various embodiments of the invention are capable of being distributed as a program product in a variety of forms, and that the invention applies equally regardless of the particular type of computer readable signal bearing media used to actually carry out the distribution. Examples of computer readable signal bearing media include but are not limited to physical and tangible recordable type media such as volatile and nonvolatile memory devices, floppy and other removable disks, hard disk drives, optical disks (e.g., CD-ROM's, DVD's, etc.), among others, and transmission type media such as digital and analog communication links.

In addition, various program code described hereinafter may be identified based upon the application or software component within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the invention is not limited to the specific organization and allocation of program functionality described herein.

F. Design Verification Example

The TLC architecture 30 described in Section D was verified using the Matlab/SIMULINK software using the full nonlinear equations of motion, Equations (3), (10), (26), and (31), and the aerodynamic force/moment model given in Section C. The state vector was given by $$X = [x_E\ y_E\ z_E\ u\ v\ w\ \phi\ \theta\ \psi\ p\ q\ r]^T, \quad (39)$$

and each of the three control surfaces (aileron, elevator, and rudder) and the constant speed propeller were implemented with actuator dynamics given as $G(s)=10/(s+10)$.

Figure 3:
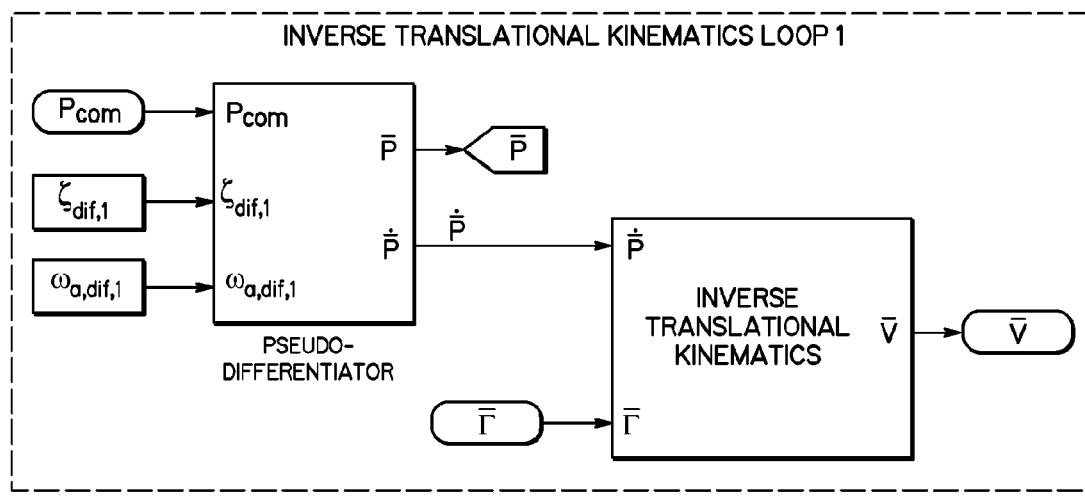
FIG. 3 is a block diagram of the inverse translational kinematics loop 1 shown in FIG. 2.

As described above, each of the four control loops shown in the FIG. 2 are constructed similarly and include a dynamic pseudo-inverse plant model and an LTV tracking error controller. As a specific example, the outer-loop guidance controller, as described FIG. 3, shows the contents of the block labeled "Inverse Translational Kinematics Loop 1" from FIG. 2. The inertial position state integrators are initialized in this block, and a three-channel pseudo-differentiator is provided for command filtering and to calculate the nominal inertial velocity.

Figure 4:
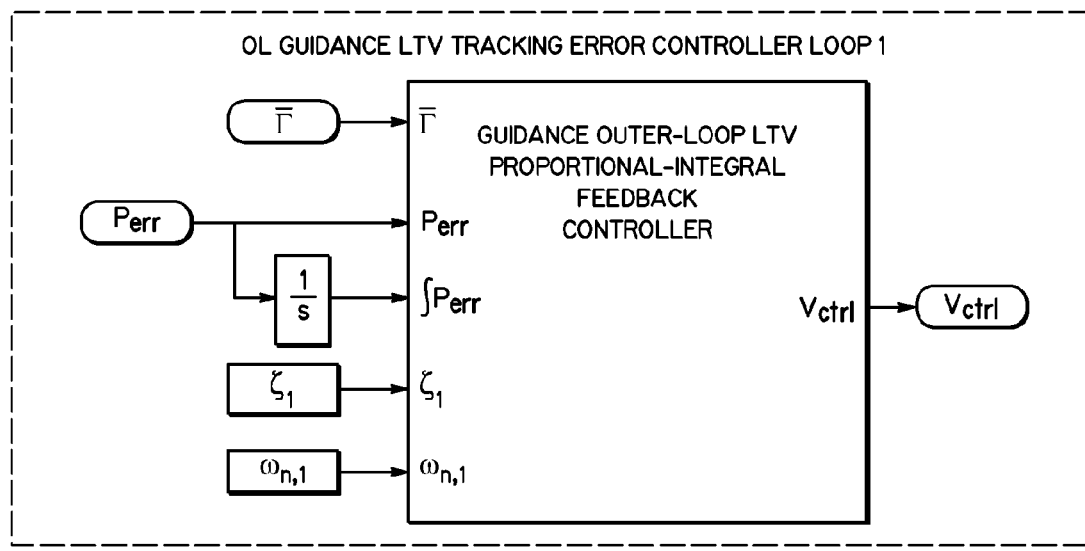
FIG. 4 is a block diagram of the OL guidance LTV tracking error controller loop 1 shown in FIG. 2.

FIG. 4 shows the contents of the feedback controller block labeled "OL Guidance LTV Tracking Error Controller Loop 1" from FIG. 2. The position error is measured and integrated, and a tracking error controller designed using PD-spectral assignment techniques is implemented. Generally, the bandwidth or natural frequency of the LTV controller need not be constants, allowing for adaptability to changing flight conditions or aircraft health when such information is available.

For the Matlab/SIMULINK simulation, a circular, coordinated turn trajectory was commanded and tracked. This particular trajectory was one of many that could be used for the simulation. All controller parameters given in Table 1 are specific to a Cessna 182 aircraft. It is noted that these are the only controller 'gains' needed for any of the feasible trajectories in the flight envelope, and no gain scheduling is needed.

TABLE 1

| | Guidance outer loop (i = 1) | | | Guidance inner loop (i = 2) | | | Attitude outer loop (i = 3) | | | Attitude inner loop (i = 4) | | |
|---|---|---|---|---|---|---|---|---|---|---|---|---|
| | $x_E$ | $y_E$ | $z_E$ | u | v | w | φ | θ | ψ | p | q | r |
| $\omega_n$ | 0.039 | 0.039 | 0.039 | 0.156 | 0.156 | 0.156 | 1.250 | 0.625 | 0.625 | 2.500 | 2.500 | 2.500 |
| ζ | 1.414 | 1.414 | 1.414 | 1.414 | 1.414 | 1.414 | 1.414 | 1.414 | 1.414 | 2.828 | 1.414 | 1.414 |
| $\omega_{n,diff}$ | 0.075 | 0.075 | 0.018 | 0.300 | 0.300 | 0.075 | 1.200 | 1.200 | 1.200 | 4.800 | 4.800 | 4.800 |
| $\zeta_{diff}$ | 1.414 | 1.4140 | 1.414 | 1.414 | 1.414 | 1.414 | 1.414 | 1.414 | 1.414 | 1.414 | 1.414 | 1.414 |

The simulation results are given in the FIGS. 6-11. In those figures, the commanded parameters are illustrated with solid lines and the sensed parameters are illustrated with broken lines. For this simulation, at t=50 s a right (starboard), circular turn trajectory is commanded at a rate of 1° per second.

While the invention has been illustrated by a description of various preferred embodiments and while these embodiments have been described in some detail, it is not the intention of the Applicants to restrict or in any way limit the scope of the appended claims to such detail. Additional advantages and modifications will readily appear to those skilled in the art. Features described with regard to certain embodiments and figures are readily adaptable to other embodiments and figures. In use, the various features of the invention may be used alone or in numerous combinations depending on the needs and preferences of the user.

What is claimed is:

1. An apparatus, comprising:
a trajectory planner adapted to produce a command position vector for a fixed-wing aircraft;
a TLC architecture electrically coupled to the trajectory planner to receive the command position vector from the trajectory planner;
an avionic sensor electrically coupled to the TLC architecture to send a sensed parameter to the TLC architecture; and
a control actuator electronically coupled to the TLC architecture to receive a control signal from the TLC architecture;
wherein the TLC architecture includes:
a processor; and
program code configured to execute on the processor to generate the control signal by:
determining in a first control loop a nominal body velocity vector and a feedback control body velocity command vector using the command position vector from the trajectory planner;
determining in a second control loop a nominal body Euler angle vector, a feedback control Euler angle command vector, and a throttle setting feedback control command using the nominal body velocity vector and the feedback control body velocity command vector from the first control loop;
determining in a third control loop a nominal body rate vector and a feedback control body rate command vector using the nominal Euler angle vector and the feedback control Euler angle command vector from the second control loop;
determining in a fourth control loop a moment command vector using the nominal body rate vector and the feedback control body rate command vector from the third control loop; and
determining the control signal using the moment command vector from the fourth control loop.

2. The apparatus of claim 1 wherein determining in the first control loop the feedback control body velocity command vector further uses a sensed position vector from the avionic sensor.

3. The apparatus of claim 1 wherein determining in the second control loop the feedback control Euler angle command vector and the throttle setting feedback control command further uses a sensed velocity vector from the avionic sensor.

4. The apparatus of claim 1 wherein determining in the third control loop the nominal body rate vector and the feedback control body rate command vector further uses a sensed Euler angle vector from the avionic sensor.

5. The apparatus of claim 1 wherein determining in the fourth control loop the moment command vector further uses a sensed body rate vector from the avionic sensor.

6. The apparatus of claim 1 wherein the sensed parameter from the avionic sensor includes a sensed position vector, a sensed velocity vector, a sensed Euler angle vector, and a sensed body rate vector.

7. The apparatus of claim 1 wherein determining in the first control loop the feedback control body velocity command vector further uses a sensed position vector from the avionic sensor, determining in the second control loop the feedback control Euler angle command vector and the throttle setting feedback control command further uses a sensed velocity vector from the avionic sensor, determining in the third control loop the nominal body rate vector and the feedback control body rate command vector further uses a sensed Euler angle vector from the avionic sensor, determining in the fourth control loop the moment command vector further uses a sensed body rate vector from the avionic sensor.

8. The apparatus of claim 1 wherein the control signal includes an engine throttle, aileron, elevator, rudder, or flaperon deflection command.

9. The apparatus of claim 1 further comprising:
an aircraft having an airframe and a control effector, the control effector being adapted to receive the control signal from the control actuator.

10. The apparatus of claim 9 wherein the control effector is an engine throttle, aileron, elevator, rudder, or flaperon.

11. A method of generating a control signal, the method comprising:
determining using a hardware implemented processor in a first control loop a nominal body velocity vector and a feedback control body velocity command vector using a command position vector for a fixed-wing aircraft from a trajectory planner;
determining using the processor in a second control loop a nominal Euler angle vector, a feedback control Euler angle command vector, and a throttle setting feedback control command using the nominal body velocity vector and the feedback control body velocity command vector from the first control loop;
determining using the processor in a third control loop a nominal body rate vector and a feedback control body rate command vector using the nominal Euler angle vector and the feedback control Euler angle command vector from the second control loop;
determining using the processor in a fourth control loop a moment command vector using the nominal body rate vector and the feedback control body rate command vector from the third control loop; and
determining using the processor a control signal using the moment command vector from the fourth control loop.

12. The method of claim 11 wherein determining in the first control loop the feedback control body velocity command vector further uses a sensed position vector from an avionic sensor.

13. The method of claim 11 wherein determining in the second control loop the feedback control Euler angle command vector and the throttle setting feedback control command further uses a sensed velocity vector from and avionic sensor.

14. The method of claim 11 wherein determining in the third control loop the nominal body rate vector and the feedback control body rate command vector further uses a sensed Euler angle vector from an avionic sensor.

15. The method of claim 11 wherein determining in the fourth control loop the moment command vector further uses a sensed body rate vector from an avionic sensor.

16. The method of claim 11 wherein determining in the first control loop the feedback control body velocity command vector further uses a sensed position vector from an avionic sensor, determining in the second control loop the feedback control Euler angle command vector and the throttle setting feedback control command further uses a sensed velocity vector from the avionic sensor, determining in the third control loop the nominal body rate vector and the feedback control body rate command vector further uses a sensed Euler angle vector from the avionic sensor, determining in the fourth control loop the moment command vector further uses a sensed body rate vector from the avionic sensor.

17. The method of claim 11 further comprising:
sending the control signal to a control actuator, the control actuator being coupled to a control effector.

18. The method of claim 17 wherein the control effector is an engine throttle, aileron, elevator, rudder, or flaperon.

19. The method of claim 18 wherein the control signal includes an engine throttle, aileron, elevator, rudder, or flaperon deflection command.

20. A program product, comprising:
a non-transitory computer readable medium; and
program code stored on the computer readable medium, the program code configured to execute on a hardware implemented processor to generate a control signal by:
determining in a first control loop a nominal body velocity vector and a feedback control body velocity command vector using the command position vector from a trajectory planner;
determining in a second control loop a nominal Euler angle vector, a feedback control Euler angle command vector, and a throttle setting feedback control command using the nominal body velocity vector and the feedback control body velocity command vector from the first control loop;
determining in a third control loop a nominal body rate vector and a feedback control body rate command vector using the nominal Euler angle vector and the feedback control Euler angle command vector from the second control loop;
determining in a fourth control loop a moment command vector using the nominal body rate vector and the feedback control body rate command vector from the third control loop; and
determining the control signal using the moment command vector from the fourth control loop.

* * * * *

UNITED STATES PATENT AND TRADEMARK OFFICE
CERTIFICATE OF CORRECTION

PATENT NO. : 8,761,966 B2
APPLICATION NO. : 13/260037
DATED : June 24, 2014
INVENTOR(S) : Jianchao Zhu and Tony M. Adami It is certified that error appears in the above-identified patent and that said Letters Patent is hereby corrected as shown below:

In the Specification:

Column 7, approximately Lines 9-13, the Equation:

$$\frac{D}{QS} = C_{D_{\alpha,trim}} + C_{D_{\beta,trim}} + C_{D_{\delta a,trim}} + C_{D_{\delta e,trim}} + C_{D_{\delta r,trim}} + C_{D_\alpha}|_{\alpha_{trim}} \tilde{\alpha} +$$

$$C_{D_{\beta,trim}}|\tilde{\beta} + C_{D_{\delta a}}|_{\delta a_{trim}} \tilde{\delta}_a +$$

$$C_{D_{\delta e}}|_{\delta e_{trim}} \tilde{\delta}_e + C_{D_{\delta r}}|_? \tilde{\delta}_r$$

should read:

$$\frac{D}{QS} = C_{D_{\alpha,trim}} + C_{D_{\beta,trim}} + C_{D_{\delta a,trim}} + C_{D_{\delta e,trim}} + C_{D_{\delta r,trim}}$$

$$+ C_{D_\alpha}\Big|_{\alpha_{trim}} \tilde{\alpha} + C_{D_{\beta,trim}}\Big|\tilde{\beta} + C_{D_{\delta a}}\Big|_{\delta a_{trim}} \tilde{\delta}_a + C_{D_{\delta e}}\Big|_{\delta e_{trim}} \tilde{\delta}_e + C_{D_{\delta r}}\Big|_{\delta r_{trim}} \tilde{\delta}_r$$

Column 10, Line 20, Equation (11):

$$\overline{F}_b = m[-B_2^{-1}(\overline{\Omega})\overline{V} + \dot{\overline{V}}]$$

Signed and Sealed this
Thirty-first Day of March, 2015

Michelle K. Lee
*Director of the United States Patent and Trademark Office*

CERTIFICATE OF CORRECTION (continued)
U.S. Pat. No. 8,761,966 B2 should read:

$$\overline{F}_b = m\left[-B_2^{-1}\left(\overline{\Omega}\right)\overline{V} + \dot{\overline{V}}\right]$$

Column 14, Line 63, the last line of Equation (32):

$$\overline{N}_m = I_{zz}\dot{r} + (I_{yy} - I_{xx})\overline{qp} - I_{xz} + + I_{xa}(\overline{qr} - \dot{p}) - N_p\overline{p} - N_r\overline{r}$$

should read:

$$\overline{N}_m = I_{zz}\dot{r} + \left(I_{yy} - I_{xx}\right)\overline{q}\,\overline{p} - I_{xz} + + I_{xz}\left(\overline{q}\,\overline{r} - \dot{p}\right) - N_p\overline{p} - N_r\overline{r}$$

Column 15, approximately Lines 46-57, Equation (38):

$$\begin{bmatrix} \delta_{a,com} \\ \delta_{e,com} \\ \delta_{r,com} \\ \delta dl_{com} \end{bmatrix} = \begin{bmatrix} QSbC_{l_{\delta a}} & 0 & QSbC_{l_{\delta r}} & 0 \\ 0 & QS\overline{c}C_{m_{\delta e}} & 0 & 0 \\ QSbC_{n_{\delta a}} & 0 & QSbC_{n_{\delta r}} & 0 \\ 0 & 0 & 0 & QSbC_{L_{\delta dl}} \end{bmatrix}^{-1} = J^{-1}\begin{bmatrix} L_{m,com} - QSbC_{l_\beta}\overline{\beta}_1 \\ M_{m,com} - QS\overline{c}C_{m_\alpha}\overline{\alpha}_1 \\ N_{m,com} - QSbC_{n_\beta}\overline{\beta}_1 \\ QSC_{L_{\delta e}} - m\overline{q}\overline{u} \end{bmatrix}$$

should read:

$$\begin{bmatrix} \delta_{a.com} \\ \delta_{e.com} \\ \delta_{r.com} \\ \delta dl_{com} \end{bmatrix} = \begin{bmatrix} QSbC_{l_{\delta a}} & 0 & QSbC_{l_{\delta r}} & 0 \\ 0 & QS\overline{c}C_{m_{\delta e}} & 0 & 0 \\ QSbC_{n_{\delta a}} & 0 & QSbC_{n_{\delta r}} & 0 \\ 0 & 0 & 0 & QSbC_{L_{\delta dl}} \end{bmatrix}^{-1} = J^{-1}\begin{bmatrix} L_{m.com} - QSbC_{l_\beta}\overline{\beta}_1 \\ M_{m.com} - QS\overline{c}C_{m_\alpha}\overline{\alpha}_1 \\ N_{m.com} - QSbC_{n_\beta}\overline{\beta}_1 \\ QSC_{L_{\delta e}}\overline{\delta}_e - m\overline{q}\overline{u} \end{bmatrix}$$